(12) United States Patent
Kelkar et al.

(10) Patent No.: US 7,623,993 B2
(45) Date of Patent: Nov. 24, 2009

(54) METHOD AND SYSTEM TO PERFORM ENERGY-EXTRACTION BASED ACTIVE NOISE CONTROL

(75) Inventors: Atul Kelkar, Ames, IA (US); Suresh M. Joshi, Hampton, VA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 684 days.

(21) Appl. No.: 10/731,742

(22) Filed: Dec. 9, 2003

(65) Prior Publication Data

US 2006/0064180 A1 Mar. 23, 2006

(51) Int. Cl.
*G06F 7/60* (2006.01)
(52) U.S. Cl. .......................................................... 703/2
(58) Field of Classification Search ...................... 703/2
See application file for complete search history.

(56) References Cited

U.S. PATENT DOCUMENTS 6,208,739 B1  3/2001  Venugopal et al.

OTHER PUBLICATIONS

Kelkar and Joshi; Robust passification via optimal sensor blending and control allocation; Jun. 2, 1999-Jun. 4, 1999; Proceedings of the American Control Conference vol. 1; ISBN: 0-7803-4990-3; pp. 278-282.*
Son et al.; Stabilization of linear systems via low-order dynamic outputfeedback: a passification approach; Proceedings of the 2000 American Control Conference, vol. 6; pp. 3822-3826.*
Pota, H. R., Reza Moheimani, S. O., and Smith, M., Dec. 7-10, 1999, "Resonant controllers for flexible structures," in Proceedings of IEEE International 38th Conference on Decision and Control, pp. 631-636.*
A.G. Kelkar and S.M. Joshi. Robust passification and control of non-passive systems. In Proceedings of the American Control Conference, Philadelphia, PA, Jun. 24-26, 1998, pp. 3133-3137.*
Jeongho Hong, James C. Akers, Ravinder Venugopal, Miin-Nan Lee, Andrew G. Sparks, Peter D. Washabaugh, and Dennis S. Bernstein. Modeling, identification, and feedback control of noise in an acoustic duct. IEEE Transactions on Control Systems Technology, 4(3):P283-291, May 1996.

(Continued)

*Primary Examiner*—Paul L Rodriguez
*Assistant Examiner*—Juan C Ochoa
(74) *Attorney, Agent, or Firm*—Reinhart Boerner Van Deuren P.C.

(57) ABSTRACT

A method to provide active noise control to reduce noise and vibration in reverberant acoustic enclosures such as aircraft, vehicles, appliances, instruments, industrial equipment and the like is presented. A continuous-time multi-input multi-output (MIMO) state space mathematical model of the plant is obtained via analytical modeling and system identification. Compensation is designed to render the mathematical model passive in the sense of mathematical system theory. The compensated system is checked to ensure robustness of the passive property of the plant. The check ensures that the passivity is preserved if the mathematical model parameters are perturbed from nominal values. A passivity-based controller is designed and verified using numerical simulations and then tested. The controller is designed so that the resulting closed-loop response shows the desired noise reduction.

15 Claims, 10 Drawing Sheets

OTHER PUBLICATIONS

A.G. Kelkar and S.M. Joshi. Robust control of non-passive systems via passification. In Proceedings of the American Control Conference, Albuquerque, NM Jun. 4-6, 1997.

H.R. Pota and A.G. Kelkar. Modelling and control of acoustic ducts. ASME Journal of Vibration and Acoustic, 123(1):2-10, Jan. 2001.

A.G. Kelkar and S.M. Joshi. An approach to acoustic noise control using passivity techniques. In IMECE, New York, Dec. 2001, to be presented.

A.G. Kelkar, Y. Mao and S.M. Joshi. LMI-based passification for control of non-passive systems. In 2000 American Control Conference (invited paper), pp. 1271-1275, Chicago, IL, Jun. 28-30, 2000.

S.M. Joshi and A.G. Kelkar. Passivity-based robust control of systems with redundant sensors and actuators. International Journal of Control, 74(5):474-481, Mar. 2001.

Y. Mao, A.G. Kelkar, and S.M. Joshi. "Synthesis of optimal constant-gain positive real controllers", Proceedings of the 1999 American Control Conference, San Diego, CA, Jun. 2-4, 1999.

A.G. Kelkar and S.M. Joshi. Robust passification and control of non-passive systems. In Proceedings of the American Control Conference, Philadelphia, PA, Jun. 24-26, 1998.

News Releases: Iowa State University; News about Science, Technology and Engineering at Iowa State University; Title—"Sensing noise and canceling it"; Apr. 2001; 3 pages.

Fang et al.; Modelling and Control of Acoustic-Structure Interaction in 3-D Enclosures; publication; Dec. 10-13, 2002; 6 pages, vol. 1; pp. 873-878; Proceedings of the 41st IEEE Conference on Decision and Control.

Kelkar et al.; Robust Bradband Control of Acoustic Duct; publication; Dec. 2000; 6 pages, pp. 4485-4490; Proceedings of the 39th IEEE Conference on Decision and Control; Sydney, Australia.

Pota et al.; On Perfect Acoustic Noise Cancelling Controllers; publication; Jun. 2000; 5 pages, pp. 3018-2022; Proceedings of the American Control Conference; Chicago, Illinois.

Pota et al.; Analysis of Perfect Noise Cancelling Controllers; publication; Sep. 25-27, 2000; 6 pages, pp. 267-272; Proceedings of the 2000 IEEE International Conference on Control Applications; Anchorage, Alaska.

Kelkar et al.; Robust Broadband Control of Acoustic Duct; publication; Sep. 25-27, 2000; 6 pages, pp. 273-278; Proceedings of the 2000 IEEE International Conference on Control Applications; Anchorage, Alaska.

* cited by examiner

METHOD AND SYSTEM TO PERFORM ENERGY-EXTRACTION BASED ACTIVE NOISE CONTROL

STATEMENT REGARDING FEDERALLY SPONSORED RESEARCH AND DEVELOPMENT

This invention was made in part with Government support under Grant Number NCC-1-01039 awarded by NASA and Grant Numbers 0196198 and 0301740 awarded by the NSF. The Government may have certain rights in this invention.

FIELD OF THE INVENTION

This invention pertains to noise suppression, and more particularly, relates to active noise control.

BACKGROUND OF THE INVENTION

Sound is a longitudinal wave phenomenon. Interference between waves has been known and observed since the time of Sir Isaac Newton. Active suppression of noise has been a goal for many decades. The potential applications of active noise suppression are many, ranging from aircraft cabins to automobile interiors to medical equipment (e.g., dentist drills, operating rooms, etc.) to buildings to household machinery such as vacuum cleaners, lawn mowers, snow blowers, washers, dryers, etc. The concept of wave dynamics and the ability of electronic amplifiers and moving coil speakers to generate accurate sound waves led to techniques used in the 1930s to reduce noise for a harmonic acoustic disturbance. The next important step was taken in the 1950s with the experimental demonstration of a very high-gain static feedback acoustic noise reduction scheme. In today's terminology, it is called a collocated control scheme with its inherent robustness properties. This basic collocated high-gain static feedback scheme is now commercially used for industrial ear protection devices.

In the 1970s, the development of acoustic noise control took a slightly different turn. Papers such as those by Jessel & Mangiante, and Swinbanks addressed the problem of acoustic noise control in ducts. The target application discussed in these papers was the reduction of noise in HVAC systems. The main idea was to measure the noise disturbance using a microphone located at an upstream location and then to feedforward this disturbance via a controller to a speaker located somewhere at the downstream location. The research showed that a proper adjustment of the controller gains would arrest the propagation of the disturbance downstream from the controlling speaker. This control technique, referred to as the feedforward control, led to several years of active noise cancellation research and development using the feedforward approach.

For several years, feedforward methods were very popular. It was argued that since feedforward scheme doesn't alter system dynamics, there was no risk of destabilizing the system (or making it any worse). These schemes required (or otherwise assumed) that the disturbance measuring microphone (located upstream) does not sense the output from the control speaker (located downstream). If it did, then it would be a feedback scenario with a danger of closed-loop instabilities. This meant that the schemes could be successfully implemented only with unidirectional microphones and speakers. In general, these conditions are very stringent. Nevertheless, researchers came up with ingenious arrangements and obtained impressive results. Most well-known are the experiments based on feedforward control by Ross and Roure wherein the controller was designed to perfectly cancel the acoustic noise. These experiments involve exact knowledge of several system transfer functions, i.e., the design needs to calculate differences of transfer functions and invert them leading to high sensitivity of the controllers to uncertainty in the system model. Owing to high sensitivity, the model information has to be obtained experimentally. This remedy, however, did not alleviate the problems as the controllers were very sensitive to the implementation and finite digit arithmetics and had to be implemented with on-line adaptation schemes. In spite of these hurdles, their success was a big inspiration for much of the work in active control of acoustic noise.

However, one important drawback of the prior feedforward strategies that are used is the necessity of an on-line adaptation, not due to the nature of the system (acoustic duct) but due to the nature of the controller itself. Adaptive control comes at a price. For large bandwidth systems such as a 3-D acoustic duct, support of a fast digital signal processor with significant memory is essential for the feedforward techniques to work. Therefore, the implementation of feedforward controllers really got boosted only after the arrival of cheap, high performance DSP (digital signal processor) chips. Another difficulty with feedforward schemes is to ensure that the adaptive control algorithm will always converge. Most algorithms guarantee convergence with known model, known controller order, and known persistency of excitation but, unfortunately, such ideal conditions are very hard to meet. As a result, feedforward methods for noise control are generally effective only at specific locations, usually downstream of the disturbance, and at specific disturbance frequencies. The need to use high performance DSPs for the computationally intensive on-line adaption schemes results in an expensive solution and the lack of robustness can make the noise worse in the event of small deviations.

Since the late nineteen eighties, active noise control research took a multifaceted approach. During this time, research efforts extended to a multitude of problems, including such items as investigation of structure-borne noise, acoustic radiation from structures, reduction of noise in ducts and enclosures, and acoustic-structure interaction. Feedforward adaptive algorithms work well when a signal strongly correlated with the noise source is available. Most of the algorithms converge nicely if the dynamics of the path between the control actuator and the sensor is known. Although some earlier successful solutions to structure-borne sound used multiple microphones and loudspeakers, subsequent studies showed that loudspeakers alone are not very efficient in controlling structure-borne sound. This observation led researchers to invent new actuators that directly act on the structure itself. It was found that an effective way to reduce the radiated acoustic energy from the structure is to control the structure so as to minimize the radiated acoustic power. Although a majority of the research during the 1980's and 1990's still used feedforward adaptive algorithms, a large number of researchers were also engaged in developing and using feedback techniques.

The research in the nineteen nineties especially involved fundamentally new approaches to active noise control—a feedback control instead of traditional feedforward methods. A significant effort was also expended looking at specific problems (e.g., active noise control for aircraft cabins, control of structure-borne noise, and a few others). In spite of difficulties, a number of approaches have succeeded in feedback control of reverberant enclosures but they are restricted primarily to the low-frequency bands. Additionally, much of the experimental work was restricted to small size cavities. Nevertheless, the success stories of feedback methods in nineties gave boost to the researchers for further exploration of feedback concept for active noise control.

The major hurdles in successful implementation of feedforward methods included availability of a reference signal having strong correlation to the noise source, necessity of online adaptation, and lack of controller robustness. For example, for structure-borne sound in aircraft it is difficult to obtain a reference signal which is strongly correlated with the noise producing mechanism. This makes feedforward control very ineffective. The advances in robust control methodologies coupled with knowledge gained in feedforward control schemes made it possible to develop closed-loop stable feedback control methods. Moreover, feedback methods have natural robustness compared to feedforward methods which is inherent in the architecture. A comparison of LQG (linear-quadratic-Gaussian), rate feedback, and filtered-x LMS (least mean squares) algorithm, presented for SISO (single output, single input) feedback control of structure-acoustic dynamics, showed that there is a definite rationale to work with feedback methods.

However, designing controllers for acoustic systems is very challenging since there is no natural roll-off at high frequencies and the systems are modally very rich. In the mid to late nineteen nineties, noteworthy research demonstrating effectiveness of feedback control methodologies emerged. For example, a PDE-based (partial differential equation-based) feedback control design was employed for controlling acoustic noise in 3-D enclosure using piezo-actuated structures. The results were only numerical and the noise was only tonal.

Although the feedback control methodology has great potential, it has several obstacles to overcome. One problem with many feedback control techniques used is that the noise attenuation can be guaranteed only locally (i.e., only at the sensor locations) and not uniformly in space and/or frequency. In fact, the noise levels can go high at some other locations although there is attenuation at the sensor locations. This essentially is the result of redistribution of acoustic energy in space. It is also possible to have worsening of noise levels at the same location due to redistribution of acoustic energy in frequency, commonly referred to as the waterbed effect.

BRIEF SUMMARY OF THE INVENTION

The invention provides a method and apparatus to provide active noise control to reduce noise and vibration in reverberant acoustic enclosures such as aircraft, vehicles, household appliances, high precision instruments requiring vibration/noise isolation, industrial equipment and the like. The invention allows the designs of quieter aircraft fuselages, vehicles, vacuum cleaners, washers, dryers, lawn and garden equipment (e.g., power blowers, lawn mowers, snow blowers, etc.), and other industrial/household machinery such as grinding machines, milling machines, cooling systems, and the like. The apparatus uses compensators and feedback control to render the system "passive" and reduce the structural and acoustic energy in the enclosure.

The method to render the apparatus includes the steps described below. A continuous-time multi-input multi-output (MIMO) state space mathematical model of the plant (i.e., the acoustic enclosure) is obtained. The model is derived via analytical modeling and system identification. Compensation is designed to render the mathematical model passive in the sense of mathematical system theory. The compensation may be series, feed-forward, feedback, hybrid, etc.

The compensated system is checked to ensure robustness of the passivity property of the plant. The check ensures that the passivity is preserved if the mathematical model parameters are perturbed from nominal values. A passivity-based controller is designed and verified using numerical simulations and then tested.

Other aspects and advantages of the invention will become more apparent from the following detailed description when taken in conjunction with the accompanying drawings.

DETAILED DESCRIPTION OF THE INVENTION

The invention extracts acoustic energy and structural energy in acoustic enclosures. The system utilizes acoustic sensors and actuators (e.g., microphones and loudspeakers) and actuators (e.g., accelerometers and piezoelectric devices) to reduce the acoustic energy and structural energy of the system. A compensator is designed to render the open-loop system passive in the sense of mathematical system theory. A positive-real feedback controller is then designed. The resulting system is typically a multi-input multi-output feedback control system that incorporates the passifier and the positive-real controller. The system can achieve uniform (in space and frequency) broadband reduction in noise and vibration levels in the enclosures. As a result, quieter aircraft fuselages, vehicles, vacuum cleaners, washers, dryers, lawn and garden equipment (e.g., power blowers, lawn mowers, snow blowers, etc.), and other industrial/household machinery such as grinding machines, milling machines, cooling systems, and the like can be designed.

Figure 1:
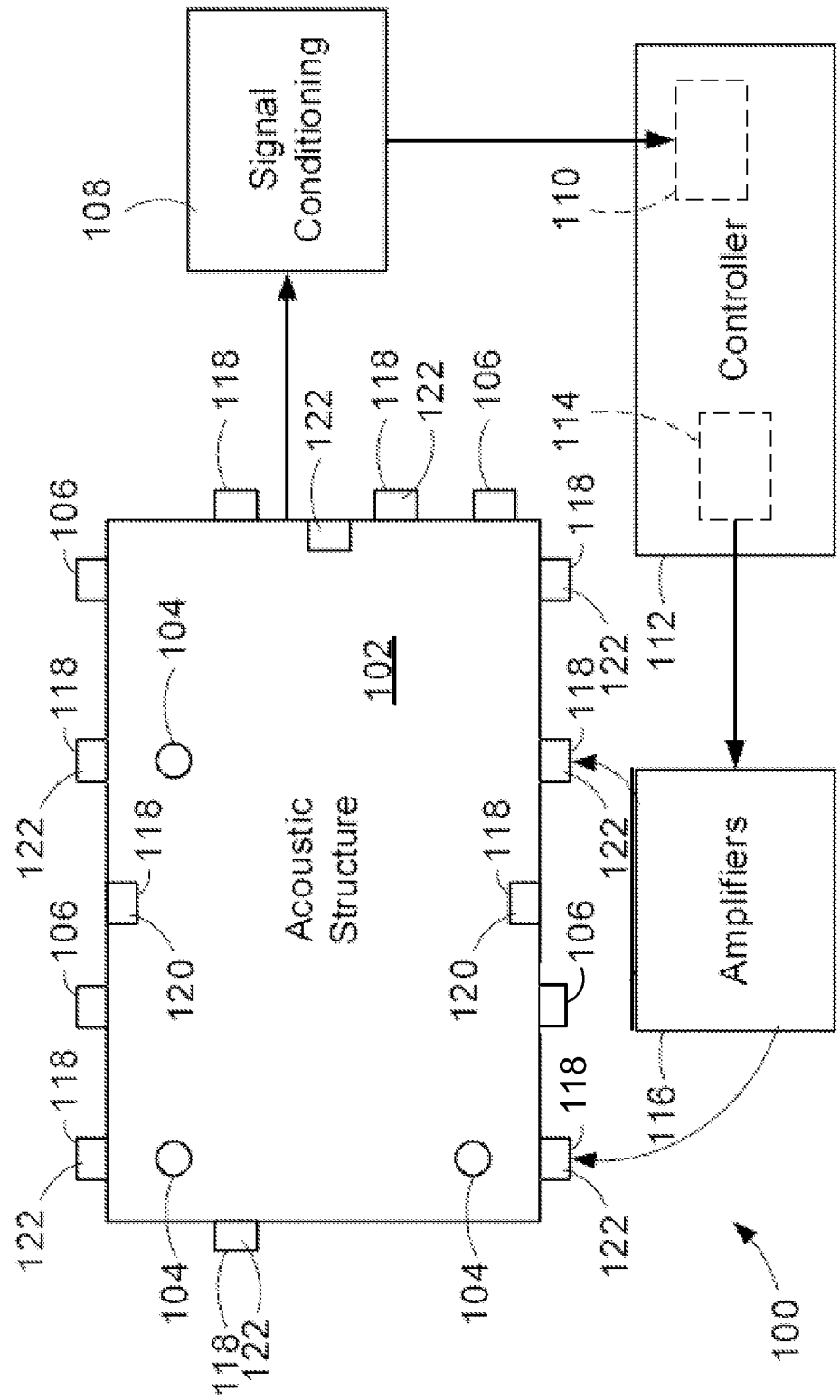
FIG. 1 is a block diagram generally illustrating an acoustic environment in which the present invention operates.

Turning to the drawings, wherein like reference numerals refer to like elements, the invention is illustrated as being implemented in a suitable environment. FIG. 1 illustrates the control system 100 and acoustic enclosure 102. The acoustic enclosure 102 may be any of the acoustic enclosures described above (e.g., enclosures such as aircraft, vehicles, household appliances, high precision instruments requiring vibration/noise isolation, industrial equipment and the like. The control system 100 includes acoustic pressure sensors 104 (e.g., microphones) and structural vibration sensors 106 (e.g., accelerometers. The acoustic pressure sensors 104 are placed within the acoustic enclosure 104 and the structural vibration sensors 106 are placed on the walls of the acoustic structure 104. Any number of acoustic pressure sensors and structural vibration sensors may be used. The location of the sensors 104, 106 may be application dependent.

The sensors 104, 106 are in communication with signal conditioners 108, which consist primarily of analog filters. The conditioned outputs of the signal conditioners 108 are converted to discrete-time digitized signals by analog-to-digital (A/D) converters 110 located within energy-extraction controller 112. The energy-extracting controller 112 consists of a processing unit that stores data and computes the control (or command) signals. In one embodiment, the processing unit is a digital signal processor. The energy-extracting controller also includes a variety of computer readable media. Computer readable media can be any available media that can be accessed by controller 112 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by controller 112. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

Digital-to-analog (D/A) converters 114 are embedded in the controller 112 and convert the digital control commands to analog commands. The analog commands are amplified by amplifiers 116. The amplified commands are sent to actuators 118 to extract energy from the acoustic enclosure 102. The actuators 118 consist of one or more acoustic signal generators 120 (e.g., loudspeakers) at various locations within the acoustic enclosure 102 and/or one or more piezo actuators 122 attached to the inside or outside of the enclosure wall. While FIG. 1 shows the amplifiers connected to only one acoustic signal generator 120 and one piezo actuator 122, it is recognized that the amplifier is in communication with all active acoustic signal generators 120 and piezo actuators 122. The actuators 118 generate the commanded structural and/or acoustic wave motion. Performance monitoring sensors (not shown) may be part of the system to measure noise (i.e., pressure) and vibration (e.g., acceleration) at desired locations to monitor the performance of the control system. The performance sensors consist of one or more acoustic pressure sensors (e.g., microphones) placed within the acoustic enclosure, and/or one or more structural vibration sensors (e.g, accelerometers) placed on the walls of the structure.

Figure 2:
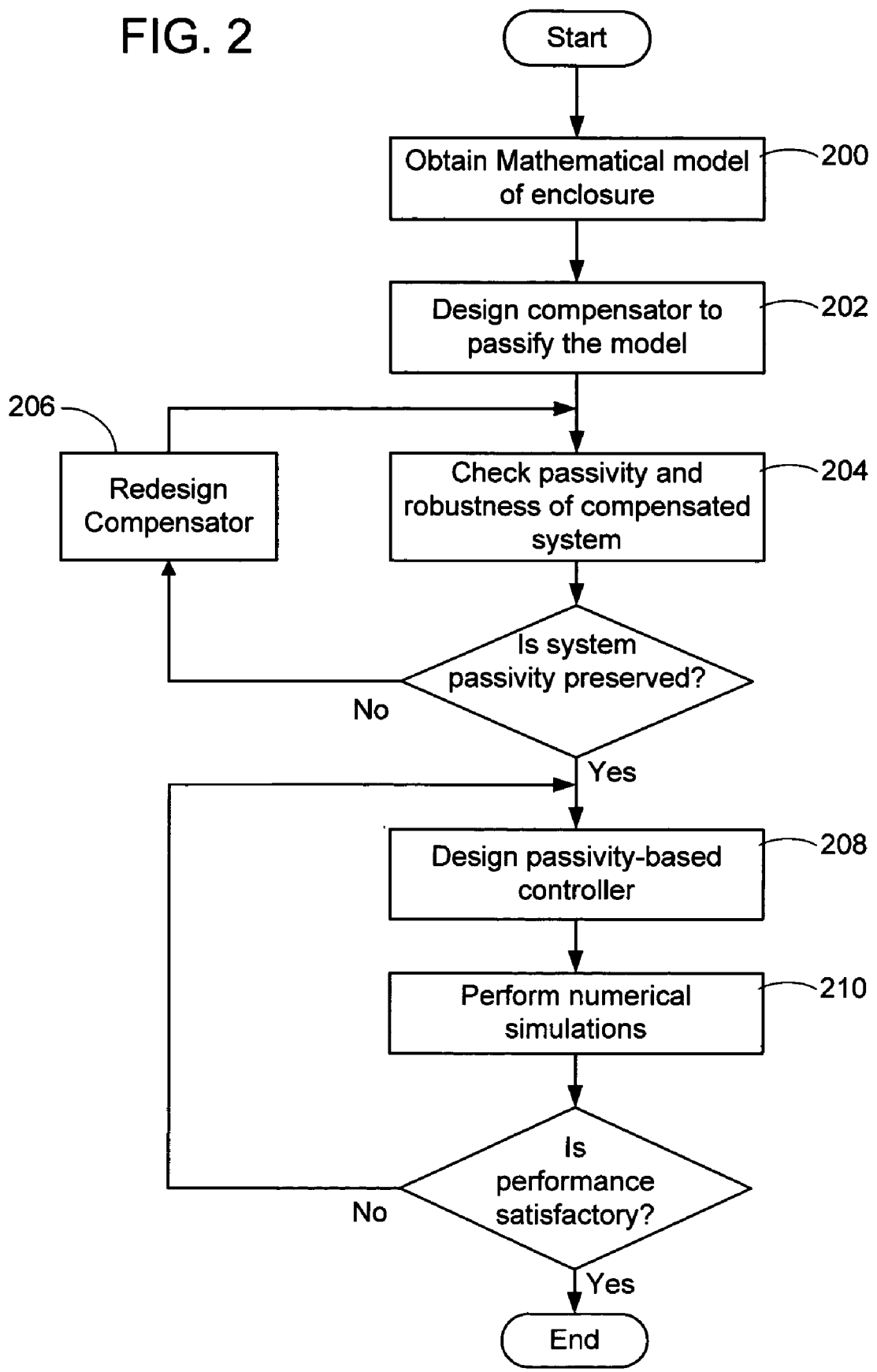
FIG. 2 is a flow chart illustrating the process of creating a controller design in accordance with the teachings of the present invention.

Turning now to FIG. 2, the controller design extracts the acoustic energy and the structural energy in the system. The controller design is based on passivity theory. The controller is designed according to the following steps. A continuous-time multi-input multi-output (MIMO) state-space mathematical model of the acoustic enclosure (henceforth also called the "plant") is obtained (step 200). The model is obtained via analytical modeling and system identification. Compensation to render the mathematical model "passive" in the sense of mathematical system theory is designed (step 202). The compensation may be series, feed-forward, feedback, hybrid, etc. (as described herein below).

The passivity of the compensated system is checked (step 204) using experimentally obtained frequency response data. Numerical tests are performed to check robustness of the passivity property of the plant, i.e., to ensure that the passivity is preserved if the mathematical model parameters are perturbed from their nominal values. If this is not the case, compensation is redesigned (step 206). Steps 204-206 are repeated until the passivity is preserved. A passivity-based controller is designed using techniques described herein (step 208). Numerical simulations are performed of the closed-loop system in the presence of a simulated broadband disturbance input (step 210). If the performance is not satisfactory, the controller is redesigned and steps 208-210 are repeated until performance is satisfactory.

Turning back to step 200, it should be noted that many members of industry who are engaged in active noise control research resort to experimental identification of system models based on frequency response data. A typical procedure involves first obtaining frequency response data and then using this data to obtain necessary transfer function or state-space models. These identification techniques also have limitations as the currently available system identification algorithms work well only for low-order systems and systems with nicely separated modes. For a 3-D acoustic enclosure with a vibrating boundary surface, these identification techniques face difficulty even with two-input one-output system. The invention provides a general purpose analytical modeling methodology for a 3-D acoustic enclosure having a vibrating boundary surface. This modeling technique accounts for the acoustic-structure interaction dynamics and yields time-domain as well as frequency-domain models.

A non-homogeneous wave equation is derived below for a general 3-D enclosure wherein the source term in the equation represents the acoustic disturbance arising from the vibrating plate boundary. Since a closed-form analytical solution is not possible when the entire boundary is considered to be vibrating, an assumption is made where only part of the boundary is considered to be vibrating. First, an infinite dimensional model is obtained which accounts for the structural-acoustic coupling. Next, the assumed modes method is employed to obtain a finite-dimensional approximate model, which is used for control design purposes. Both the state-space model and the transfer function model are derived analytically.

Figure 3:
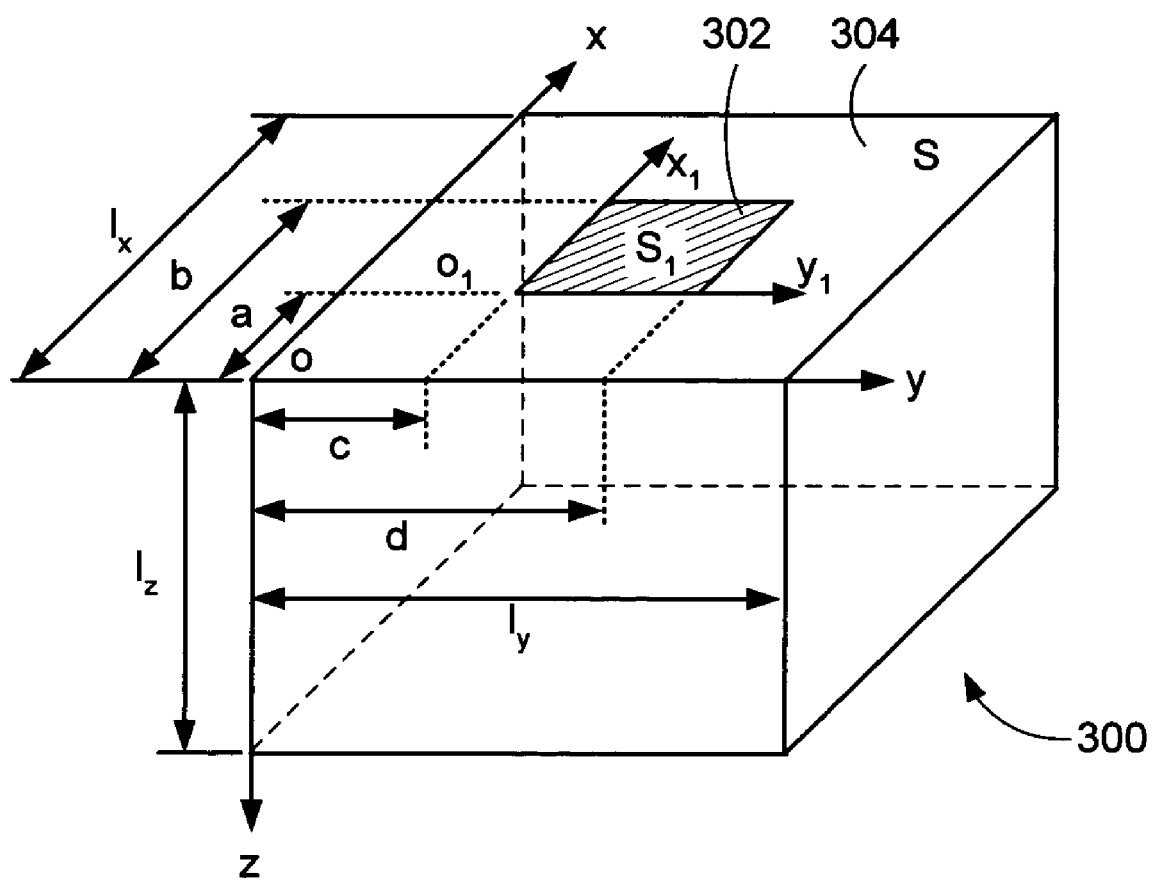
FIG. 3 is a block diagram of an acoustic enclosure on which the controller design of the present invention operates.

Turning now to FIG. 3, a 3-D acoustic enclosure 300 with a part 302 of one boundary surface 304 representing a vibrating plate (denoted by $S_1$). Let the entire boundary surface be denoted by S. Prior to proceeding, given below is the list of definitions of various variables and parameters used in deriving the acoustic-structure interaction dynamics for the enclosure.

$\vec{v}(t, x, y, z)$ is fluid velocity in m/s $p(t, x, y, z)$ is acoustic pressure fluctuation from equilibrium in $N/m^2$ $\rho$ is fluid density fluctuation from equilibrium in $kg/m^3$ $p_0$ is acoustic pressure at equilibrium in $N/m^2$ $\rho_0$ is fluid density at equilibrium, $kg/m^3$ $\omega(t, x_1, y_1)$ is the transverse displacement of the plate in m f(t, $x_1$, $y_1$) is the externally applied force on the plate due to acoustic pressure from an exterior noise field in N $u_i$(t) are control forces acting at the points ($x_{li}$; $y_{li}$); i=1, 2, ..., r on the plate and normal to the plate in N The acoustic pressure and the fluid density at any instant of time are given by p(t, x, y, z)+$\rho_0$ and $\rho$(t, x, y, z)+$\rho_0$. The control forces, $u_i$(t), are produced by piezoelectric actuators and can be treated as point sources. For theoretical derivation, we make a necessary and reasonable assumption that the plate is simply supported on its four sides and that the initial displacements and velocities at all points on the plate are zero. The goal is to obtain a governing relation between the acoustic pressure fluctuation p(t, x, y, z) inside of a 3-D enclosure such as enclosure 300 in FIG. 3 and external disturbances f(t, $x_1$, $y_1$) and $u_i$(t), i=1, 2, ..., r. The model of the vibrating boundary surface ($S_1$) is first established followed by the development of the acoustic model for inside of the enclosure.

The dynamic model of the vibrating surface 304 (i.e., the plate) can be obtained using Hamilton's principle, which states that: Of all possible paths of motion that can be taken between the instants of time $t_1$ and $t_2$, the actual path taken by the system gives a stationary (extremum) value to the integral $$I = \int_{t_1}^{t_2} (K_1 + W_1 + U_1) dt \quad (1)$$

where, $K_1$ is the kinetic energy of the system, $U_1$ the potential energy of the system, and $W_1$ is the work of the externally applied forces. It is assumed that the quantity $K_1+W_1-U_1$ is conservative. Now, for a two dimensional system with one dependent variable, if the integral in Equation 1 can be expressed as $$I(\omega) = \int_{t_1}^{t_2} \int\int_{S_1} F(x_1, y_1, t, \omega, \dot{\omega}, \omega_{x_1}, \omega_{y_1}, \omega_{x_1 x_1}, \omega_{x_1 y_1}, \omega_{y_1 y_1}) dx_1 dy_1 dt \quad (2)$$

from Hamilton's Principle and variational calculus, the governing PDE (partial differential equation) for the system can be derived from $$l_1(\omega) - l_2(\dot{\omega}) = 0 \quad (3)$$

where $$l_1(\omega) = F_\omega - \frac{\partial F_{\omega_{x_1}}}{\partial x_1} - \frac{\partial F_{\omega_{y_1}}}{\partial y_1} - \frac{\partial^2 F_{\omega_{x_1 x_1}}}{\partial x_1^2} + \frac{\partial^2 F_{\omega_{y_1 y_1}}}{\partial y_1^2} + \frac{\partial^2 F_{\omega_{x_1 y_1}}}{\partial x_1 \partial y_1}$$

$$l_2(\dot{\omega}) = \frac{\partial F_{\dot{\omega}}}{\partial t}$$

For a vibrating plate, one can calculate $U_1$, $K_1$, and $W_1$ as follows:

$$U_1 = \quad (4)$$

$$\frac{D}{2} \int\int_{S_1} \left\{ \left( \frac{\partial^2 \omega}{\partial x_1^2} + \frac{\partial^2 \omega}{\partial y_1^2} \right)^2 - 2(1-\nu) \left[ \frac{\partial^2 \omega}{\partial x_1^2} \frac{\partial^2 \omega}{\partial y_1^2} - \left( \frac{\partial^2 \omega}{\partial x_1 \partial y_1} \right)^2 \right] \right\} dS_1$$

-continued $$K_1 = \frac{h}{2} \int\int_{S_1} \rho_p \left( \frac{\partial \omega}{\partial t} \right)^2 dS_1$$

$$W_1 = \sum_{i=1}^{r} \int\int_{S_1} u_i(t)\omega(t, x_1, y_1)\delta(x_1 - x_{1i})\delta(y_1 - y_{1i}) dS_1 +$$

$$\int\int_{S_1} [f(t, x_1, y_1) - p(t, x_1, y_1, 0)]\omega(t, x_1, y_1) dS_1$$

where h, and $\rho_p$ are the thickness and density of the plate, respectively, E is the Young's modulus, $\nu$ is the Poisson's ratio, and $$D = \frac{Eh^3}{12(1-\nu^2)}$$

is the flexural rigidity of the plate. In Equation 2, the function F is given by $$F = -\frac{D}{2} \left\{ \left( \frac{\partial^2 \omega}{\partial x_1^2} + \frac{\partial^2 \omega}{\partial y_1^2} \right)^2 - 2(1-\nu) \left[ \frac{\partial^2 \omega}{\partial x_1^2} \frac{\partial^2 \omega}{\partial y_1^2} - \left( \frac{\partial^2 \omega}{\partial x_1 y_1} \right)^2 \right] \right\} + \quad (5)$$

$$\frac{h}{2}\rho_p \left( \frac{\partial \omega}{\partial t} \right)^2 + \sum_{i=1}^{r} u_i(t)\omega(t, x_1, y_1)\delta(x_1 - x_{1i})$$

$$\delta(y_1 - y_{1i}) + [f(t, x_1, y_1) + p(t, x_1, y_1, 0)]\omega(t, x_1, y_1)$$

The governing equation of the plate can be obtained from Equation 3 as $$D\nabla^4 \omega + h\rho_p \frac{\partial^2 \omega}{\partial t^2} = \quad (6)$$

$$\sum_{i=1}^{r} u_i(t)\delta(x_1 - x_{1i})\delta(y_1 - y_{1i}) + f(t, x_1, y_1) + p(t, x_1, y_1, 0)$$

The boundary conditions for the plate are given by $$\begin{cases} \omega(t, 0, y) = 0 \\ \omega(t, l_x, y) = 0 \\ \omega(t, x, 0) = 0 \\ \omega(t, x, l_y) = 0 \end{cases} \quad \begin{aligned} \frac{\partial^2 \omega(t, 0, y)}{\partial x^2} &= 0 \\ \frac{\partial^2 \omega(t, l_x, y)}{\partial x^2} &= 0 \\ \frac{\partial^2 \omega(t, x, 0)}{\partial y^2} &= 0 \\ \frac{\partial^2 \omega(t, x, l_y)}{\partial y^2} &= 0 \end{aligned} \quad (7)$$

The governing equation for the acoustics in the enclosure 400 shall now be derived. For the enclosure 300 under consideration, a part of one of its boundary surfaces is a vibrating surface and we can consider this surface as a distributed noise source. The fluctuating volume flow per unit volume is then given by $\rho_0 \omega_t(t, x_1, y_1)\delta(z)$ for $0 \leq x_1 \leq b-a$ and $0 \leq y_1 \leq d-c$ The linearized mass conservation equation and momentum conservation equation for the system under consideration can be written as $$\frac{\partial \rho(t, x, y, z)}{\partial t} + \rho_0 \vec{\nabla} \cdot \vec{v}(t, x, y, z) = \rho_0 \omega_t(t, x_1, y_1)\delta(z) \quad (8)$$

$$\rho_0 \frac{\partial \vec{v}(t, x, y, z)}{\partial t} + \nabla \rho(t, x, y, z) = 0 \quad (9)$$

Now, using the relationship $p(t, x, y, z)=c_0^2 \rho(t, x, y, z)$, where $c_0$ is the sound speed, the divergence ($\nabla \cdot$) of the momentum conservation equation, and then subtracting the time derivative of the mass conservation equation, the non-homogeneous wave equation is obtained as follows $$\nabla^2 \rho(t, x, y, z) - \frac{1}{c_0^2} \frac{\partial^2 \rho(t, x, y, z)}{\partial t^2} = -\rho_0 \omega_{tt}(t, x-a, y-c) \quad (10)$$

$$[H(x-a) - H(x-b)]$$

$$[H(y-c) - H(y-d)]\delta(z)$$

where $H(\cdot)$ is the Heaviside function. For the closed 3-D enclosure 300 under consideration we have the following boundary conditions $$\vec{v}(t, x, y, z) \cdot \vec{n} = 0 \text{ on } S \quad (11)$$

where $\vec{n}$ is the outward normal direction at every point on surface S. Using Equation 9, the boundary conditions in Eq. (11) can be rewritten as $$\nabla p(t, x, y, z) \cdot \vec{n} = 0 \text{ on } S \quad (12)$$

We will now derive the governing differential equations for the vibrating surface (plate) as well as the acoustic pressure fluctuation dynamics in the modal space as it will allow us to obtain the finite-dimensional approximate models of the system for controller design and experimental verification. First, we will consider only the homogeneous part of Equation 6 with boundary conditions (i.e., Equation 7), that is, $$D\nabla^4 \omega + h\rho_p \frac{\partial^2 \omega}{\partial t^2} = 0 \quad (13)$$

Assume the solution is of the form $\omega(t, x_1, y_1) = \text{Re}\{W(x_1, y_1)e^{i\omega t}\}$. Equation 13 is transformed into $$\nabla^4 W - (K\Omega)^4 W = 0 \quad (14)$$

where $K^4 = h\rho_p/D$, $\Omega^2 = \omega^2$. Now separating variables $x_1$ and $y_1$, W can be written as $$W(x_1, y_1) = X(x_1)Y(y_1)$$

Equation 14 can now be re-written as $$[X^{(4)} - (K\Omega)^4 X]Y + 2X''Y'' + XY^{(4)} = 0 \quad (15)$$

Now considering the solutions which are separable. Let $$X'' = -\beta^2 X \quad (16)$$

then $$X^{(4)} = -\beta^2 X'' = \beta^4 X$$

Similarly, the equation to determine Y is $$Y^{(4)} - 2\beta^2 Y'' - [(K\Omega)^4 - \beta^4]Y = 0 \quad (17)$$

For the case, $(K\Omega)^4 - \beta^4 > 0$, the solutions of Equations 16 and 17 are given by $$X(x_1) = A_1 \cos(\beta x_1) + A_2 \sin(\beta x_1) \quad (18)$$

$$Y(y_1) = B_1 \cos(\delta y_1) + B_2 \sin(\delta y_1) + B_3 \cosh(\epsilon y_1) + B_4 \sinh(\epsilon y_1) \quad (19)$$

where $$\delta = \sqrt{(K\Omega)^2 - \beta^2}, \varepsilon = \sqrt{(K\Omega)^2 + \beta^2},$$

and $A_i$, $B_i$ are coefficients to be determined. Note that for the case when $(K\Omega)^4 - \beta^4 < 0$, there are no solutions. The solution $W(x_1, y_1)$ can now be given by $$W(x_1, y_1) = [A_1\cos(\beta x_1) + A_2\sin(\beta x_1)] \times \quad (20)$$

$$[B_1\cos(\delta y_1) + B_2\sin(\delta y_1) +$$

$$B_3\cosh(\varepsilon y_1) + B_4\sinh(\varepsilon y_1)]$$

The boundary conditions (7) can be expressed in terms of W as $$\begin{cases} W(0, y_1) = 0, & \frac{\partial^2 W(0, y_1)}{\partial x_1^2} = 0 \\ W(b-a, y_1) = 0, & \frac{\partial^2 W(b-a, y_1)}{\partial x_1^2} = 0 \\ W(x_1, 0) = 0, & \frac{\partial^2 W(x_1, 0)}{\partial y_1^2} = 0 \\ W(x_1, d-c) = 0, & \frac{\partial^2 W(x_1, d-c)}{\partial y_1^2} = 0 \end{cases} \quad (21)$$

The coefficients and parameters in Equation 20 can be determined from these boundary conditions to be $A_1 = B_1 = B_3 = B_4 = 0$, $\sin[(b-a)\beta] = 0$, $\sin[(d-c)\delta] = 0$. The normal modes of the plate are $$\phi_{nm}(x_1, y_1) = A_{nm} \sin(\beta_n x_1) \sin(\delta_m y_1), n, m = 1, 2, \quad (22)$$

where, $\beta_n = n\pi/(b-a)$, $\delta_m = m\pi/(d-c)$. The natural frequencies are $$\omega_{nm} = \Omega_{nm}^2 = \frac{\pi^2}{K^2}\left[\left(\frac{n}{b-a}\right)^2 + \left(\frac{m}{d-c}\right)^2\right] \quad (23)$$

By the orthogonality condition:

$$\frac{1}{S_1} \int\int_{S_1} \phi_{n_1 m_1} \phi_{n_2 m_2} dS_1 = \delta(n_1, n_2)\delta(m_1, m_2)$$

the coefficients can be determined as $A_{nm} = 2$.

The excitation of the plate due to acoustic pressure load from inside of enclosure is insignificant compared to piezo forces. That is, the dynamic interaction is much stronger from structure to acoustics than from acoustics to structure. Data obtained in applications such as aircraft cabins shows that the dynamic interaction from fuselage to interior acoustics is much stronger than in the opposite direction. In view of this, the acoustic pressure fluctuation p(t, x, y, z) term in equation 6 is neglected without much loss of accuracy. The mathematical simplicity achieved by this assumption outweighs the effects of modeling errors caused by the omission of this term. As a result, the governing equation 6 for the plate can now be re-written as $$D\nabla^4 \omega + h\rho_p \frac{\partial^2 \omega}{\partial t^2} = \sum_{i=1}^{r} u_i(t)\delta(x_1 - x_{1i})\delta(y_1 - y_{1i}) + f(t, x_1, y_1) \quad (24)$$

Using the assumed modes approach the solution of this PDE can be expressed as an infinite series representing an infinite sum of the weighted normal modes of the system, i.e., $$\omega(t, x_1, y_1) = \sum_{n=1}^{\infty} \sum_{m=1}^{\infty} q_{nm}(t)\phi_{nm}(x_1, y_1) \quad (25)$$

where $q_{nm}(t)$ are the modal coordinates and $\phi_{nm}(x_1, y_1)$ are the corresponding mode shapes. For the control design purposes, we need to obtain a finite dimensional model of the system. This can be done by approximating the solution in equation 25 using a finite number of modes. That is, we can truncate the series by choosing limits on n and m as n:$1 \to p_1$ and m:$1 \to p_2$. Then, the solution for $\omega(\cdot)$ can be given by $$\omega(t, x_1, y_1) \approx \sum_{n=1}^{p_1} \sum_{m=1}^{p_2} q_{nm}(t)\phi_{nm}(x_1, y_1) \quad (26)$$

Substituting equation 26 into equation 24 and multiplying it by $\phi_{nm}(x_1, y_1)$ and integrating it over $S_1$, we get $$h\rho_p \ddot{q}_{nm}(t) + D(\beta_n^2 + \delta_m^2)^2 q_{nm}(t) = \frac{1}{S_1}\sum_{i=1}^{r} u_i(t)\phi_{nm}(x_{1i}, y_{1i}) + f_{nm}(t) \quad (27)$$

where, $$f_{nm}(t) = \frac{1}{S_1}\int\int_{S_1} f(t, x_1, y_1)\phi_{nm}(x_1, y_1)dS_1$$

It should be noted that equation 27 does not contain any damping terms as there is no known method to analytically derive the modal damping in the system. The damping has to be introduced a posteriori into the model. Introducing the modal damping $\zeta_{nm}$(n=1, 2, ..., $p_1$, m=1, 2, ..., $p_2$) into the equation, we obtain $$\ddot{q}_{nm}(t) + 2\zeta_{nm}\omega_{nm}\dot{q}_{nm}(t) + \omega_{nm}^2 q_{nm}(t) = \frac{1}{h\rho_p} \quad (28)$$

-continued $$\left[\frac{1}{S_1}\sum_{i=1}^{r} u_i(t)\phi_{nm}(x_1, y_1) + f_{nm}(t)\right]$$

The modal coordinates can be determined by Duhamal integral. Once the modal coordinate solution is obtained, the response of the plate to external and control forces can be obtained by equation 26.

The solution for acoustic pressure p(•) using the assumed modes method. Let us assume that the solution of the wave equation 10 with boundary conditions 12 can be expressed as a finite sum of weighted normal modes.

$$P(t, x, y, z) = \sum_{k_1=0}^{l_1} \sum_{k_2=0}^{l_2} \sum_{k_3=0}^{l_3} q_{k_1 k_2 k_3}(t)\psi_{k_1 k_2 k_3}(x, y, z) \quad (29)$$

where $\psi_{k_1 k_2 k_3}(x, y, z)$ are the normal modes of the homogeneous part of equation 10 with boundary conditions (equation 12). That is, $$\psi_{k_1 k_2 k_3}(x, y, z) = A_{k_1 k_2 k_3}\cos\xi_{k_1}x \cos\xi_{k_2}y \cos\xi_{k_3}z \quad (k_1, k_2, k_3=0, 1, 2, ...) \quad (30)$$

where $\xi_{k_1}=k_1\pi/l_x$, $\xi_{k_2}=k_2\pi/l_y$, $\xi_{k_3}=k_3\pi/l_z$ and $q_{k_1 k_2 k_3}(t)$ are the modal coordinates. Substituting equations 26 and 29 into wave equation 10, we get $$\sum_{k_1=0}^{l_1} \sum_{k_2=0}^{l_2} \sum_{k_3=0}^{l_3} \left[\psi_{k_1 k_2 k_3}(x, y, z)\ddot{q}_{k_1 k_2 k_3}(t) + c_0^2(\xi_{k_1}^2 + \xi_{k_2}^2 + \xi_{k_3}^2)^2 \psi_{k_1 k_2 k_3}(x, y, z)q_{k_1 k_2 k_3}(t)\right] = \quad (31)$$

$$c_0^2 \rho_0 \sum_{n=1}^{p_1}\sum_{m=1}^{p_2} \ddot{q}_{nm}(t)\phi_{nm}(x-a, y-c)[H(x-a) - H(x-b)][H(y-c) - H(y-d)]\delta(z)$$

Multiplying equation 31 by $\psi_{k_1 k_2 k_3}(x, y, z)$, integrating the equation over entire volume of the enclosure 400, using the orthogonality condition, and adding the modal damping term to the equation, we obtain $$\ddot{q}_{yk_1 k_2 k_3}(t) + 2\zeta_{k_1}\zeta_{k_2}\zeta_{k_3}\omega_{k_1 k_2 k_3}\dot{q}_{k_1 k_2 k_3}(t) + \omega_{k_1 k_2 k_3}^2 q_{k_1 k_2 k_3}(t) = \quad (32)$$

$$\frac{c_0^2 \rho_0}{V} \sum_{n=1}^{p_1}\sum_{m=1}^{p_2} \alpha_{k_1 k_2 k_3 nm}\ddot{q}_{nm}(t)$$

where $\zeta_{k_1 k_2 k_3}$ are modal damping ratios, $$\omega_{k_1 k_2 k_3} = c_0\sqrt{\xi_{k_1}^2 + \xi_{k_2}^2 + \xi_{k_3}^2}$$

$$V = l_x l_y l_z$$

$$\alpha_{k_1 k_2 k_3 nm} = \int\int_{S_1} \psi_{k_1 k_2 k_3}(x_1 + a, y_1 + c, 0)\phi_{nm}(x_1, y_1)dS_1$$

Now that the solution for acoustic pressure has been described, the state-space models of the system shall be described. Let the state variables be defined as $$x = (x^p, x^a)^T = [(x_{nm}^p, y_{nm}^p)^T, (x_{k_1k_2k_3}^a, y_{k_1k_2k_3}^a)^T]^T \quad (33)$$

where $x_{nm}^p = q_{nm}$, $y_{nm}^p = \dot{q}_{nm}$, $x_{k_1k_2k_3}^a = q_{k_1k_2k_3}$, $y_{k_1k_2k_3}^a = \dot{q}_{k_1k_2k_3}$, $n=1, 2, \ldots p_1$; $m=1, 2, \ldots p_2$; $k_1=0, 1, \ldots, l_1$; $k_2=0, 1, \ldots, l_2$; and $k_3=0, 1, \ldots, l_3$. If the external force can be expressed as $f(t, x_1, y_1) = f(t)g(x_1, y_1)$, $f_{nm}(t)$ can be expressed as $$f_{nm}(t) = \left[ \frac{1}{S_1} \int\int_{S_1} g(x_1, y_1) \phi_{nm}(x_1, y_1) dS_1 \right] f(t) \quad (34)$$
$$= \gamma_{nm} f(t)$$

Then equations 28 and 32 can be re-written as $$\begin{cases} \dot{x}_{nm}^p = y_{nm}^p \\ \dot{y}_{nm}^p = -\omega_{nm}^2 x_{nm}^p - 2\zeta_{nm}\omega_{nm} y_{nm}^p + \frac{1}{h\rho_p S_1} \sum_{i=1}^{r} \phi_{nm}(x_{1i}, y_{1i}) u_i(t) + \frac{\gamma_{nm}}{h\rho_p} f(t) \\ \dot{x}_{k_1k_2k_3}^a = y_{k_1k_2k_3}^a \sum_{n=1}^{p_1} \sum_{m=1}^{p_2} \left( -\frac{c_0^2 \rho_0}{V} \alpha_{k_1k_2k_3 nm} \right) \dot{y}_{nm}^p + \dot{y}_{k_1k_2k_3}^a = -\omega_{k_1k_2k_3}^2 x_{k_1k_2k_3}^a - 2\zeta_{k_1k_2k_3}\omega_{k_1k_2k_3} y_{k_1k_2k_3}^a \end{cases} \quad (35)$$

In the state-space form, the model for a 3-D enclosure under consideration is given by $$E\dot{x}(t) = Ax(t) + Bu(t) + Df(t) \quad (36)$$

Matrices E, A, B, and D are given by $$E = \begin{bmatrix} E_{11} & 0 \\ E_{21} & E_{22} \end{bmatrix} \quad A = \begin{bmatrix} A_{11} & 0 \\ 0 & A_{22} \end{bmatrix}$$

$$B = \frac{1}{h\rho_0 S_1} \begin{bmatrix} B_{11} \\ 0 \end{bmatrix} \quad D = \frac{1}{h\rho_0} \begin{bmatrix} D_{11} \\ 0 \end{bmatrix}$$

where, $E_{11} = I$ and $A_{11} = \text{diag}(A_{11}^{nm})$ are square matrices of order $p_1 p_2$, $E_{22} = I$ and $A_{22} = \text{diag}(A_{22}^{k_1k_2k_3})$ are square matrices of order $(l_1+1)(l_2+1)(l_3+1)$, $B_{11}$ is a $p_1 p_2 \times r$ matrix, and $D_{11}$ is a $p_1 p_2 \times 1$ matrix. Moreover, matrices $E_{21}$, $A_{11}$, $A_{22}$, $B_{11}$, and $D_{11}$ are given as follows $$E_{21} = -\frac{c_0^2 \rho_0}{V} \begin{bmatrix} 0 & 0 & \cdots 0 & 0 \\ 0 & \alpha_{00111} & \cdots 0 & \alpha_{001p_1p_2} \\ \cdots & \cdots & & \cdots \\ 0 & 0 & \cdots 0 & 0 \\ 0 & \alpha_{l_1l_2l_311} & \cdots 0 & \alpha_{l_1l_2l_3p_1p_2} \end{bmatrix}$$

$$A_{11}^{nm} = \begin{bmatrix} 0 & 1 \\ -\omega_{nm}^2 & -2\zeta_{nm}\omega_{nm} \end{bmatrix}$$

$$A_{22}^{k_1k_2k_3} = \begin{bmatrix} 0 & 1 \\ -\omega_{k_1k_2k_3}^2 & -2\zeta_{k_1k_2k_3}\omega_{k_1k_2k_3} \end{bmatrix}$$

$$B_{11} = \begin{bmatrix} 0 & \cdots & 0 \\ \phi_{11}(x_{11}, y_{11}) & \cdots & \phi_{11}(x_{1r}, y_{1r}) \\ \cdots & \cdots & \cdots \\ 0 & \cdots & 0 \\ \phi_{p_1p_2}(x_{11}, y_{11}) & \cdots & \phi_{p_1p_2}(x_{1r}, y_{1r}) \end{bmatrix}$$

$$D_{11} = \begin{bmatrix} 0 \\ \gamma_{11} \\ \cdots \\ 0 \\ \gamma_{p_1p_2} \end{bmatrix}$$

If we place k microphones in the position of $(x_i, y_i, z_i)$, $i=1, \ldots, k$, the outputs of the system can be written as $P(t) = (p(t, x_1, y_1, z_1), \ldots, p(t, x_k, y_k, z_k))^T$. Since matrix E is invertible, the state-space model (equation 36) can be re-written as $$\begin{cases} \dot{x}(t) = E^{-1}Ax(t) + E^{-1}Bu(t) + E^{-1}Df(t) \\ P(t) = Cx(t) \end{cases} \quad (37)$$

where $$C = [C_1' C_2' \cdots C_k']^T$$

The C matrix has k rows, and $C_i$ has the form $$C_i = (0, \ldots, 0; \psi_{001}(x_i, y_i, z_i), 0, \ldots, \psi_{l_1l_2l_3}(x_i, y_i, z_i), 0)$$
$$i = 1, \ldots k \quad (38)$$

Now that the state space model has been described, the transfer function model shall be described. For single-input single-output (SISO) systems, if we let $f(t, x_1, y_1) = 0$ and take the Laplace transform of equations 28 and 32, we get $$(s^2 + 2\zeta_{nm}\omega_{nm}s + \omega_{nm}^2)Q_{nm}(s) = \frac{1}{h\rho_0 S_1}\phi_{nm}(x_{11}, y_{11})U(s) \quad (39)$$

$$(s^2 + 2\zeta_{k_1k_2k_3}\omega_{k_1k_2k_3}s + \omega_{k_1k_2k_3}^2)Q_{k_1k_2k_3}(s) = \quad (40)$$
$$\frac{c_0^2\rho_0}{V}\sum_{n=1}^{p_1}\sum_{m=1}^{p_2}\alpha_{k_1k_2k_3nm}s^2 Q_{nm}(s)$$

that is

-continued $$Q_{k_1k_2k_3}(s) = \frac{Js^2}{s^2 + 2\zeta_{k_1k_2k_3}\omega_{k_1k_2k_3}s + \omega_{k_1k_2k_3}^2} \quad (41)$$

$$\sum_{n=1}^{p_1}\sum_{m=1}^{p_2} \frac{\alpha_{k_1k_2k_3nm}\phi_{nm}(x_{11}, y_{11})}{s^2 + 2\zeta_{nm}\omega_{nm}s + \omega_{nm}^2} \cdot U(s)$$

where $$J = \frac{c_0^2 \rho_0}{Vh\rho_p S_1}.$$

Taking the Laplace transform of equation 29, we can obtain a SISO transfer function for the output being the acoustic pressure measured at the microphone located at $(x_0, y_0, z_0)$ as $$G(s) = Js^2 \sum_{k_1=0}^{l_1}\sum_{k_2=0}^{l_2}\sum_{k_3=0}^{l_3} \frac{\psi_{k_1k_2k_3}(x_0, y_0, z_0)}{s^2 + 2\zeta_{k_1k_2k_3}\omega_{k_1k_2k_3}s + \omega_{k_1k_2k_3}^2} \left[\sum_{n=1}^{p_1}\sum_{m=1}^{p_2} \frac{\alpha_{k_1k_2k_3nm}\phi_{nm}(x_{11}, y_{11})}{s^2 + 2\zeta_{nm}\omega_{nm}s + \omega_{nm}^2}\right] \quad (42)$$

To obtain the transfer function of the enclosure (i.e., equation 42), we used "hard" boundary conditions (i.e., equation 11 or equation 12). For more general boundary conditions, such as the soft boundaries, the following transfer function is used. On the boundary S, there exists the following relationship $$P(r, s) = Z(r, s)U(r, s) \cdot n(r) \quad (43)$$

where $r=(x, y, z)$, $P(r, s)$ and $U(s)$ are the Laplace transforms of $p(t, r)$ and $\bar{v}(t, r)$ respectively, and $Z(r, s)$ is the wall impedance. Substituting equation 43 into the Laplace transform of equation 9, we can get $$\nabla P(r, s) \cdot n(r) = -\rho_0 s \frac{P(r, s)}{Z(r, s)} \text{ where } r \text{ is } S \quad (44)$$

Assume that the solution of the Laplace transformed equation of the wave equation (equation 10) can be written as $$P(r, s) = \sum_{i=1}^{l} \Psi_i(r) Q_i(s) \quad (45)$$

where the following orthogonality condition are imposed on mode functions $$\int_V \Psi_i(r)\Psi_j(r)dV = \delta_{ij} \quad (46)$$

Multiplying the Laplace transform of the wave equation equation 10 by $\Phi_j(r)$ and take the volume integral of the equation to get $$\int_V \Psi_j(r)\nabla^2 P(r, s)dV - \frac{s^2}{c_0^2}\int_V \Psi_j(r)P(r, s)dV = -\rho_0 s^2 \sum_{n=1}^{p_1}\sum_{m=1}^{p_2} \eta_{jnm}Q_{nm}(s) \quad (47)$$

where $$\eta_{jnm} = \int_V \Psi_j(r)$$
$$\phi_{nm}(x-a, y-c)[H(x-a) - H(x-b)][H(y-c) - H(y-d)]\delta(z)dV.$$

Using Green's first formula in terms of the appropriate variables, the first term in the left hand side of equation 47 can be expressed as $$\int_V \Psi_j(r)\nabla^2 P(r, s)dV = \quad (48)$$
$$\int_S \Psi_j(r)\nabla P(r, s) \cdot n(r)ds - \int_V \nabla \Psi_j(r) \cdot \nabla P(r, s)dV$$

We can then calculate $$\int_S \Psi_j(r)\nabla P(r, s) \cdot n(r)dS = -\rho_0 s \sum_{i=1}^{l} [D_{ji}(s)Q_i(s)]$$

$$\int_V \nabla \Psi_j(r) \cdot \nabla P(r, s)dV = \sum_{i=1}^{l} \beta_{ji}Q_i(s)$$

$$\int_V \Psi_j(r)P(r, s)dV = Q_j(s)$$

where $$D_{ji}(s) = \int_S \frac{\Psi_j(s)\Psi_i(s)}{Z(r, s)}dS, \beta_{ji} = \int_V \nabla \Psi_j(r)\nabla \Psi_i(r)dV.$$

Equation 47 becomes $$\sum_{i=1}^{l}[\rho_0 s D_{ji}(s) + \beta_{ji}]Q_i(s) + \frac{s^2}{c_0^2}Q_j(s) = \rho_0 s^2 \sum_{n=1}^{p1}\sum_{m=1}^{p2}\eta_{jnm}Q_{nm}(s) \quad (49)$$

$$j = 1, 2, \cdots, l$$

Note that in practice it is often found that $D_{ji}(s)$ for $j \neq i$ are negligible, in that case the expression for $Q_j(s)$ can be written as $$Q_j(s) = \frac{\rho_0 s^2}{\frac{s^2}{c_0^2} + \rho_0 s D_{jj}(s) + \beta_{jj}}\sum_{n=1}^{p1}\sum_{m=1}^{p2}\eta_{jnm}Q_{nm}(s) \quad (50)$$

Substituting equations 50 and 39 into equation 45, we get the transfer function for the enclosure with soft boundaries as $$G_{sb}(s) = \sum_{i=1}^{t} \frac{\rho_0 s^2 c_0^2}{h \rho_p S_1} \cdot \frac{\Psi_i(r_0)}{s^2 + \rho_0 c_0^2 s D_{ii}(s) + c_0^2 \beta_{ii}} \cdot \left[ \sum_{n=1}^{p1} \sum_{m=1}^{p2} \frac{\eta_{inm} Q_{nm}(x_{11}, y_{11})}{s^2 + 2\zeta_{nm} \omega_{nm} s + \omega_{nm}^2} \right] \quad (51)$$

Now that the modeling has been described, the linearized dynamics of a structure-acoustic enclosure can be expressed in the state-space form as:

$$\dot{x}(t) = Ax(t) + Bu(t) + B_N N(t) \quad (52)$$

$$y(t) = Cx(t) + Du(t) + D_N N(t) \quad (53)$$

$$z(t) = C_z x(t) \quad (54)$$

where x, u, y, and z are n-, m-, m-, and 1-dimensional state vector, input vector, control-output vector, and performance-output vector, respectively (all functions of time t). The state vector x(t) consists of the acoustic state variables (pressures and rates) as well as structural vibration state variables (modal amplitudes and rates for the elastic modes). N(t) is the external disturbance vector consisting of external noise and/or forces (e.g., due to the aircraft engine or air-friction at the airframe). The control-output y(t) is utilized for generating the feedback control signal u(t), while the performance output z(t) denotes a combination of noise levels (pressures) and vibration (accelerations) at locations where the performance is monitored. A, B, C, D, $B_N$, $D_N$ are appropriately dimensioned matrices. The relationship between u(t) and y(t) can also be expressed as the transfer function $$P(s) = C(sI - A)^{-1} B + D \quad (55)$$

The controller design is based on the concept of passivity. An m×m rational matrix G(s) is said to be positive real (PR) if
  (i) all elements of G(s) are analytic in Re(s)>0;
  (ii) G(s)+G*(s)>0 in Re(s)>0 (where G* denotes the conjugate-transpose); or equivalently,
    (iia) poles on the imaginary axis are simple and have nonnegative-definite residues, and
    (iib) G(jω)+G*(jω)≧0 for ωϵ(−∞, ∞)

For single-input, single-output (SISO) systems, condition (iib) is equivalent to: Re[G(jω)]≧0, or equivalently, the phase of G(jω) remains between −90° and +90°.

G{s} is said to be weakly strictly positive real (WSPR) if G(s) is stable (i.e., has all the Smith-McMillan poles in the open left-half of the complex plane), and the inequality in (iib) is strict (>), which requires the transmission zeros to be in the open left-half plane. The stability requirement can be weakened as follows to define the least restrictive class of positive real matrices, which permits imaginary-axis poles.

An m×m rational matrix G(s) is said to be marginally strictly positive real (MSPR) if it is positive real, and $$G(j\omega) + G^*(j\omega) > 0 \text{ for } \omega \in (-\infty, \infty)$$

Note that if G(s) is stable and MSPR, it is WSPR.

The most important property of positive real systems is that they are robustly stabilized by any MSPR controller C(s) if none of the purely imaginary poles of G(s) is a transmission zero of C(s). Thus a PR system is robustly stabilized by any WSPR controller. The stability is guaranteed regardless of modeling inaccuracies and uncertainties.

This robust stability property offers an attractive approach to robust controller synthesis for PR systems that can provide optimal performance along with guaranteed stability. However, the transfer function of an acoustic-structure system is not positive-real, (i.e., it is a non-passive system). The approach of this invention is to "passify" (i.e., render passive) the system using compensation. Subsequently the feedback loop is closed with a suitably designed positive-real controller.

Figure 4A:
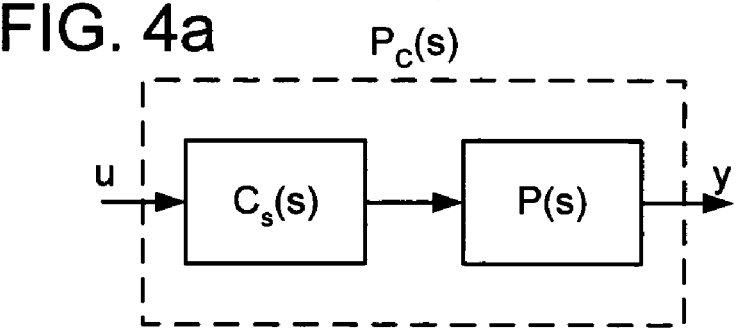
FIGS. 4a-4e illustrate passification methods according to the teachings of the present invention.
Figure 4B:
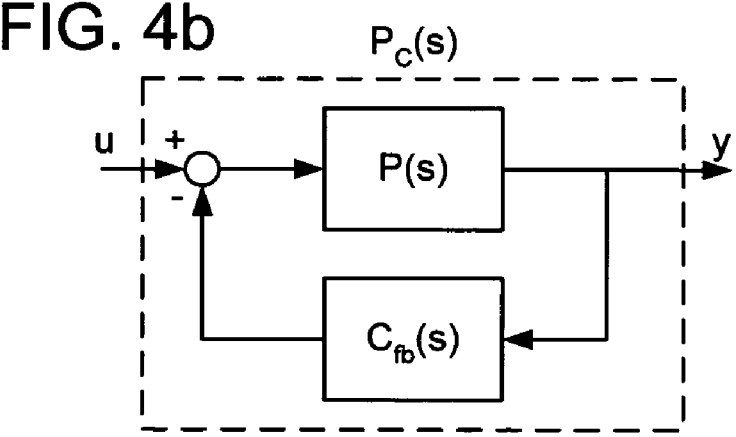
Figure 4C:
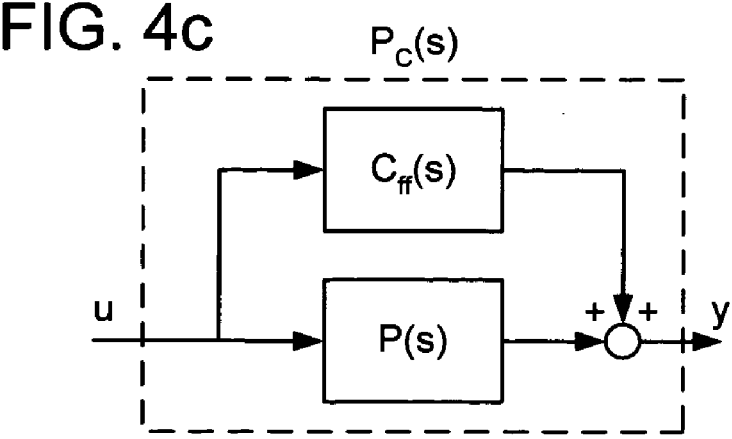
Figure 4D:
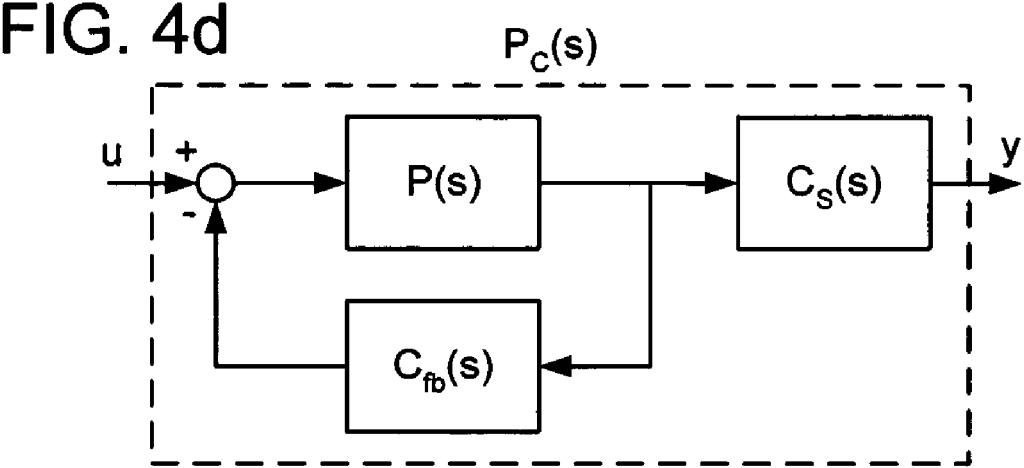
Figure 4E:
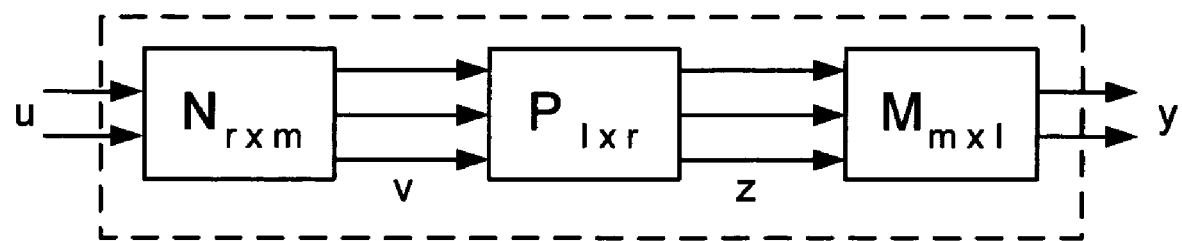

The passifying compensators include series compensation, output feedback compensation, feedforward compensation, hybrid compensation (i.e., combination of series, feedback, and feedforward), and sensor blending and/or actuator allocation (applicable to systems having multiple sensors and actuators). FIGS. 4a-e shows block diagrams of different types of passifications. FIG. 4a illustrates series passification. FIG. 4b illustrates feedback passification. FIG. 4c illustrates feedforward passification. FIG. 4d illustrates hybrid passification. FIG. 4e illustrates sensor/actuator blending. In each of FIGS. 4a-4e, P(s) indicates the non-passive plant and $P_c(s)$ indicates the passified plant. FIG. 4-e shows one of many possible configurations for hybrid passification. For single-input, single output (SISO) systems, passification can be accomplished in a fairly simple manner by using Bode plots, whereas for multi-input multi-output (MIMO) systems, passification is more complex and is best performed in state-space setting using tools such as linear matrix inequalities.

Different types of non-passive systems warrant different types or combination of different types of passification methods. An important consideration in the design of a passifying compensator is the robustness of passification. The stability robustness depends on the robustness of passification as the passivity is not inherent to the system, but depends on the passifying compensator. The structural-acoustic system is usually non-minimum-phase. Therefore the approach of this invention is to first render the system minimum-phase by using a feedforward compensation Cff(s). For many structure-acoustic systems, a constant feedforward matrix Dff is sufficient. The design of such a matrix can be accomplished by using linear-matrix-inequalities (LMI). Only the minimum necessary feedforward gain should be used for passification because it tends to limit the effective feedback gain and hence the performance.

Designing a series passifying compensator can be accomplished by using LMI techniques. Alternatively, if large numbers of actuators and control sensors are available, the techniques of optimal blending of sensor signals and optimal allocation of control inputs are used. After designing the passifying compensator, the passivity of the compensated plant is verified using experimentally obtained frequency response data of the system and numerically generated frequency response data of the passifying compensator. In addition, numerical computations are also performed to verify that the system transfer function remains 'robustly PR' in spite of parameter variations within a specified range (such as +/−25%). If the system does not remain 'robustly PR', the passification is redesigned to accomplish robust positive realness.

Designing an optimal controller that is also PR. The methods described in the paper "Synthesis of LQ-Optimal Constant-Gain Positive-Real Controllers", *Control and Intelligent Systems*, 29(3):65-73, 2001 by A. G. Kelkar, Y. Mao, and S. M. Joshi, hereby incorporated by reference in its entirety, for optimal constant-gain positive real controllers are used. Closed-loop simulation studies are performed, using a white noise disturbance input signal ω(t), to determine the reduction in noise and vibration. If the reduction is not adequate, an optimal PR linear-quadratic-Gaussian (LQG) controller is designed. The performance is verified via simulation. If the performance is not adequate, additional actuators and control sensors are installed and the design process is repeated. If the performance is satisfactory, the overall controller, consisting of the passifying compensator and the PR feedback controller, is realized as a digital filter and is implemented as the "energy-extracting controller" shown in FIG. 1.

Now that the theory has been described, the details of the passification techniques shall be described. Passification can be performed via series compensation. Series compensation can be performed either at the input (pre-compensation), as shown in FIG. 4(a), or at the output (post-compensation). We shall only present the pre-compensation technique. The series post-compensation is similar.

Consider a non-passive plant:

$$G(s) \sim \begin{cases} \dot{x} = Ax + Bu' \\ y = Cx + Du' \end{cases} \quad (56)$$

Series passification can be used only for Lyapunov-stable, minimum-phase systems. Acoustic-structure systems are always asymptotically stable, but they can be non-minimum-phase (i.e., one or more transmission zeros of the realization [A, B, C, D] can be in the closed right half of the complex plain. If the system is non-minimum-phase, it must first be rendered minimum phase via feedforward compensation. If an m×m constant feedforward gain matrix Dff is used, the resulting system is [A, B, C, (D+$D_{ff}$)], and its inverse is given by: [(A−BD$_{eff}^{-1}$C), BD$_{eff}^{-1}$, D$_{eff}^{-1}$C, D$_{eff}^{-1}$] where D$_{eff}$=D+D$_{ff}$ is assumed to be nonsingular. Therefore the transmission zeros of [A, B, C, (D+D$_{ff}$)] are the eigenvalues of (A−BD$_{eff}^{-1}$C). Thus, if the system [A, B, C, D] can be stabilized by constant-gain output feedback F, it can be rendered minimum-phase by a constant feedforward gain gain $D_{ff}$ which is obtained from: F=(D+D$_{ff}$)$^{-1}$. F can be obtained by using multivariable pole placement methods or by trial and error by setting $D_{ff}$ to be a positive diagonal matrix and increasing its elements until the inverse system is stable. It is advisable to find the smallest $D_{ff}$ such that the inverse system is stable. The resulting minimum-phase system is henceforth denoted as: [A, B, C, D].

The series passifier (FIG. 4(a)) is given by:

$$C_s(s) \sim \begin{cases} \dot{x}_c = A_c x_c + B_c u \\ u' = C_c x_c + D_c u \end{cases} \quad (57)$$

Then the compensated system is given by:

$$G_s(s) \sim \begin{cases} \dot{\tilde{x}} = \tilde{A}\tilde{x} + \tilde{B}u \\ y = \tilde{C}\tilde{x} + \tilde{D}u \end{cases} \quad (58)$$

where $$\tilde{x} = \begin{bmatrix} x \\ x_c \end{bmatrix}, \tilde{A} = \begin{bmatrix} A & BC_c \\ 0 & A_c \end{bmatrix}, \tilde{B} = \begin{bmatrix} BD_c \\ B_c \end{bmatrix} \quad (59)$$

$\tilde{C}[C \ DC_c]$, and $\tilde{D} = DD_c$.

For the compensated system ($G_c(s)$) to be passive, we need ($\tilde{A}, \tilde{B}, \tilde{C}, \tilde{D}$) to satisfy the following inequality $$\begin{bmatrix} \tilde{A}^T P + P\tilde{A} & P\tilde{B} \\ \tilde{B}^T P & 0 \end{bmatrix} + \begin{bmatrix} \tilde{C} & \tilde{D} \end{bmatrix}^T \begin{bmatrix} 0 & -I \\ -I & 0 \end{bmatrix} \begin{bmatrix} \tilde{C} & \tilde{D} \\ 0 & I \end{bmatrix} < 0 \quad (60)$$

Matrix P is a symmetric positive definite solution to the inequality (i.e., Equation 60). Existence of such P ensures positive realness of Gc(s). Note that Equation 60 is nonlinear in matrix variables $A_c$, $B_c$, $C_c$, $D_c$, and P, and therefore, does not constitute an LMI. This nonlinear matrix inequality, however, can be converted into an equivalent LMI using a judiciously chosen nonlinear matrix transformation. Given below is the procedure to convert this nonlinear matrix inequality into an LMI.

Let us suppose matrices P and P$^{-1}$ can be partitioned as:

$$P = \begin{bmatrix} Y & N \\ N^T & * \end{bmatrix} \quad P^{-1} = \begin{bmatrix} X & M \\ M^T & * \end{bmatrix} \quad (61)$$

where X and Y are symmetric and full rank matrices with the restriction that $$XY + MN^T = I \quad (62)$$

Further, if we define $$\Pi_1 = \begin{bmatrix} X & I \\ M^T & 0 \end{bmatrix}, \Pi_2 = \begin{bmatrix} I & Y \\ 0 & N^T \end{bmatrix} \quad (63)$$

then, since PP$^{-1}$=I, $\Pi_1$ and $\Pi_2$ have the following properties $$P\Pi_1 = \Pi_2 \text{ and } \Pi_1^T P\Pi_1 = \Pi_1^T \Pi_2 \begin{bmatrix} X & I \\ I & Y \end{bmatrix} \quad (64)$$

Let $$\Pi = \begin{bmatrix} \Pi_1 & 0 \\ 0 & I \end{bmatrix}.$$

Now pre- and post-multiplying Equation 60 by $\Pi^T$ and $\Pi$, respectively, does not change the inequality, i.e., $$\begin{bmatrix} \Pi_1^T(\tilde{A}^T P + P\tilde{A})\Pi_1 & \Pi_1^T P\tilde{B} \\ (\tilde{B}^T P)\Pi_1 & 0 \end{bmatrix} + \begin{bmatrix} 0 & -\Pi_1^T \tilde{C}^T \\ -\tilde{C}\Pi_1 & -(\tilde{D} + \tilde{D}^T) \end{bmatrix} < 0 \quad (65)$$

where

-continued $$\Pi_1^T P \tilde{A} \Pi_1 = \Pi_2^T \tilde{A} \Pi_1$$
$$= \begin{bmatrix} I & 0 \\ Y & N \end{bmatrix} \begin{bmatrix} A & BC_c \\ 0 & A_c \end{bmatrix} \begin{bmatrix} X & I \\ M^T & 0 \end{bmatrix}$$
$$= \begin{bmatrix} AX + BC_c M^T & A \\ YAX + YBC_c M^T + NA_c M^T & YA \end{bmatrix}$$

Now consider the following change of variables $$\hat{A} = YAX + YBC_c M^T + NA_c M^T$$

$$\hat{B} = YBD_c + NB_c$$

$$\hat{C} = C_c M^T$$

$$\hat{D} = D_c \tag{66}$$

Using transformation equations (66), we get $$\Pi_1^T P \tilde{A} \Pi_1 = \begin{bmatrix} AX + B\hat{C} & A \\ \hat{A} & YA \end{bmatrix} \tag{67}$$

$$\Pi_1^T \tilde{A}^T P \Pi_1 = \begin{bmatrix} (AX + B\hat{C})^T & \hat{A}^T \\ A^T & (YA)^T \end{bmatrix}$$

$$\Pi_1^T P \tilde{B} = \Pi_2^T \tilde{B} = \begin{bmatrix} I & 0 \\ Y & N \end{bmatrix} \begin{bmatrix} BD_c \\ B_c \end{bmatrix} = \begin{bmatrix} B\hat{D} \\ \hat{B} \end{bmatrix}$$

$$\tilde{C} \Pi_1 = [C \ DC_c] \begin{bmatrix} X & I \\ M^T & 0 \end{bmatrix} = [CX + D\hat{C} \ C]$$

Substituting Equations 67 in Equation 65, we get an LMI in variables X, Y, $\hat{A}$, $\hat{B}$, $\hat{C}$, and $\hat{D}$.

$$\begin{bmatrix} A^{**} & (*) & (*) \\ \hat{A} + A^T & YA + A^T Y & (*) \\ \hat{D}^T B^T - CX - D\hat{C} & \hat{B}^T - C & D^{**} \end{bmatrix} \tag{68}$$

where $A^{} = AX + XA^T + B\hat{C} + \hat{C}^T B^T$, $D^{} = -D\hat{D} - \hat{D}^T D^T$ and (*) indicates the transposes of their corresponding off-diagonal counterparts.

If the solution to Equation 68 is feasible, the passifying compensator Cs(s) can be recovered by following the step-by-step procedure below.
1) Solve equation 68 to obtain X, Y, $\hat{A}$, $\hat{B}$, $\hat{C}$, and $\hat{D}$
2) Construct M, N, and P such that they satisfy Equation 64. (Note that M and N should satisfy Equation 62. Also, since $$\begin{bmatrix} X & I \\ I & Y \end{bmatrix} > 0, Y > 0,$$

and X−Y$^{-1}$>0, I−XY is nonsingular, i.e., we can always find nonsingular square matrices M and N satisfying equation 62)
3) Solve equations 66 in reverse order to obtain Ac, Bc, Cc, and Dc.

Passification via feedforward (parallel) compensation shall now be described. Consider a plant:

$$G(s) \sim \begin{cases} \dot{x} = Ax + Bu' \\ y = Cx + Du' \end{cases} \tag{69}$$

and feedforward compensator (FIG. 4 (c)):

$$C_{ff}(s) \sim \begin{cases} \dot{x}_c = A_c x_c + B_c u \\ y_2 = C_c x_c + D_c u \end{cases} \tag{70}$$

Then the compensated system is given by:

$$G_c(s) \sim \begin{cases} \dot{\tilde{x}} = \tilde{A}\tilde{x} + \tilde{B}u \\ y = \tilde{C}\tilde{x} + \tilde{D}u \end{cases} \tag{71}$$

where $$\tilde{x} = \begin{bmatrix} x \\ x_c \end{bmatrix}, \tilde{A} = \begin{bmatrix} A & 0 \\ 0 & A_c \end{bmatrix}, \tilde{B} = \begin{bmatrix} B \\ B_c \end{bmatrix} \text{ and} \tag{72}$$

$$\tilde{C} = [C \ C_c], \tilde{D} = D + D_c.$$

For the compensated system to be passive, we need, as in the previous cases, $$\begin{bmatrix} \tilde{A}^T P + P\tilde{A} & P\tilde{B} \\ \tilde{B}^T P & 0 \end{bmatrix} + \begin{bmatrix} \tilde{C} & \tilde{D} \\ 0 & I \end{bmatrix}^T \begin{bmatrix} 0 & -I \\ -I & 0 \end{bmatrix} \begin{bmatrix} \tilde{C} & \tilde{D} \\ 0 & I \end{bmatrix} < 0 \tag{73}$$

Pre- and post-multiplying equation 72 by $\Pi^T$ and $\Pi$, respectively, we get $$\begin{bmatrix} \Pi_1^T(\tilde{A}^T P + P\tilde{A})\Pi_1 & \Pi_1^T P\tilde{B} \\ (\tilde{B}^T P)\Pi_1 & 0 \end{bmatrix} + \begin{bmatrix} 0 & -\Pi_1^T \tilde{C}^T \\ -\tilde{C}\Pi_1 & -(\tilde{D} + \tilde{D}^T) \end{bmatrix} < 0 \tag{73}$$

where $$\Pi_1^T P \tilde{A} \Pi_1 = \Pi_2^T \tilde{A} \Pi_1 = \begin{bmatrix} AX & A \\ YAX + NA_c M^T & YA \end{bmatrix} \tag{74}$$

Now consider the following change of variables $$\hat{A} = YAX + NA_c M^T$$

$$\hat{B} = NB_c$$

$$\hat{C} = C_c M^T$$

$$\hat{D} = D_c \tag{75}$$

Using equations 75, we get $$\Pi_1^T P \tilde{A} \Pi_1 = \begin{bmatrix} AX & A \\ \hat{A} & YA \end{bmatrix} \tag{76}$$

-continued $$\Pi_1^T \tilde{A}^T P \Pi_1 = \begin{bmatrix} XA^T & \hat{A}^T \\ A^T & A^T Y \end{bmatrix}$$

$$\Pi_1^T P \tilde{B} = \Pi_2^T \tilde{B} = \begin{bmatrix} B \\ YB + \hat{B} \end{bmatrix}$$

$$\check{C}\Pi_1 = \begin{bmatrix} CX + \hat{C} & C \end{bmatrix}$$

Substituting equations 76 in equation 73 we get an LMI in variables X, Y, Â, B̂, Ĉ, and D̂.

$$\begin{bmatrix} AX + XA^T & (*) & (*) \\ \hat{A} + A^T & YA + A^T Y & (*) \\ B^T - CX - \hat{C} & B^T Y + \hat{B}^T - C & D^\perp \end{bmatrix} < 0 \quad (77)$$

where $D^\perp = -(D+D^T+\hat{D}+\hat{D}^T)$ and (*) represents elements which are transpose of their corresponding off-diagonal counterparts. The design process will again involve the steps given in previous paragraphs. In this case also, similar to series passification, it is required that the non-passive plant be open-loop stable.

Constant-gain feedforward passification shall now be described. The simplest feedforward compensation is a constant gain Dc rather than a dynamic compensator. In that case, the compensated system is PR if and only if there exist matrices $P=P^T>0$ and Dc such that $$\begin{bmatrix} A^T P + PA & PB - C^T \\ B^T P - C & -(D+D_C) - (D+D_C)^T \end{bmatrix} \leq 0 \quad (78)$$

Dc is constrained to be symmetric and non-negative definite and a solution that minimizes the trace of Dc is obtained.

Passification via sensor blending and control allocation shall now be described. In some cases, many sensors (accelerometers and/or microphones) may be available for measuring the vibration accelerations and pressures at various locations. In such cases, sensor blending can be performed (matrix M in FIG. 4(e)) to passify the system. Similarly, if many actuators (piezos and/or loud speakers) are available, control allocation can be performed (matrix N in FIG. 4(e)). These passification techniques for obtaining a system that is robustly positive real in the presence of parameter uncertainties are described herein.

Consider the system S (p) given by:

$$\dot{x} = A(p)x + B(p)u; \quad y = C(p)x + D(p)u \quad (79)$$

where $p \in R^k$ denotes the vector of uncertain parameters and x, u, y are n-, r-, and l-dimensional state, input, and output vectors respectively. A(p), B(p), C(p), D(p) are appropriately dimensioned matrices that are assumed to be affine functions of the parameter vector p. The parameters $p_i$ ($i=1, 2, \ldots k$), which are components of p, are assumed to lie in a hyper-rectangular box in the parameter space, defined as:

$$\beta = \{p : p_i \in [\underline{p}_i, \overline{p}_i], i=1, 2, \ldots k\} \quad (80)$$

$\underline{p}_i$ and $\overline{p}_i$, $i=1, 2, \ldots k$, denote the lower and upper bounds on $p_i$. Define $$\mu_i = \frac{1}{2}(\overline{p}_i + \underline{p}_i) \text{ and } \delta_i = \frac{1}{2}(\overline{p}_i - \underline{p}_i), I = 1, 2, \ldots k \quad (81)$$

Expanding $p_i$ as $p_i = \mu_i + \alpha_i \delta_i$ where $\alpha_i \in [-1, 1]$, the system matrices can be written as:

$$A(p) = A(\mu) + \sum_{i=1}^{k} \alpha_i \delta_i A_i; \quad B(p) = B(\mu) + \sum_{i=1}^{k} \alpha_i \delta_i B_i \quad (82)$$

$$C(p) = C(\mu) + \sum_{i=1}^{k} \alpha_i \delta_i C_i; \quad D(p) = D(\mu) + \sum_{i=1}^{k} \alpha_i \delta_i D_i \quad (83)$$

where $\mu = [\mu_1, \mu_2, \ldots \mu_k]^T$ and $A_i$, $B_i$, $C_i$, $D_i$ are constant matrices. The ith element ($i=1, 2, \ldots k$) of the jth vertex $p^j$, ($j=1, 2, \ldots 2^k$) of β is given by:

$$p_i^j = \mu_i + \gamma_{ij} \delta_i \, (\gamma_{ij} = -1 \text{ or } 1) \quad (84)$$

Then the system matrix at $p=p^j$ is given by $$A(p^j) = A(\mu) + \sum_{i=1}^{k} \gamma_{ij} \delta_j A_i$$

$B(p^j)$, $C(p^j)$, and $D(p^j)$ are similarly defined.

The following theorem presents a sufficient condition for the system to be robustly passive $\forall_p \in B$. Note that passivity is defined only for 'square' systems (i.e., with the same number of inputs and outputs). Suppose $l=r$. The system S(p) is passive if there exists a symmetric positive-definite matrix P that is a solution of the following system of $2^k$ LMIs:

$$Z(p^i, P) := \begin{bmatrix} A^T(p^j)P + PA(p^j) & PB(p^j) - C^T(p^j) \\ B^T(p^j)P - C(p^j) & -(D(p^j) + D^T(p^j)) \end{bmatrix} \leq 0 \quad (85)$$

for $j = 1, 2, \cdots 2^k$

For sensor blending where $l > r$, it is required to find a blending matrix $M \in R^{r \times l}$ such that the system $S_M = [A, B, MC, MD]$ is passive. Further, it is required to maximize the size of the parameter box β in which the system remains passive. Consider the parameter box defined by $\{p : p_i \in [u_i - \theta \delta_i, u_i + \theta \delta_i], i=1, 2, \ldots k\}$ where θ is a dilation parameter. The ith element of the vertex $p^j$, $j=1, 2, \ldots 2^k$, of the parameter box with dilation θ is given by:

$$p_i^j = \mu_i + \gamma_{ij} \theta \delta_i \, (i=1, 2, \ldots k) \quad (86)$$

The problem is to find a blending matrix M which will maximize the dilation θ while passifying the system.

The system matrices at the vertices have the form:

$$A(p^j) = A(\mu) + \theta \sum_{i=1}^{k} \gamma_{ij} \delta_i A_i; \quad B(p^j) = B(\mu) + \theta \sum_{i=1}^{k} \gamma_{ij} \delta_i B_i \quad (87)$$

-continued $$C(p^j) = C(\mu) + \theta \sum_{i=1}^{k} \gamma_{ij}\delta_i C_i; \quad D(p^j) = D(\mu) + \theta \sum_{i=1}^{k} \gamma_{ij}\delta_i D_i \quad (88)$$

where $\gamma_{ij}=-1$ or 1. Define $$A_{sj} = -\sum_{i=1}^{k} \gamma_{ij}\delta_i A_i \quad B_{sj} = -\sum_{i=1}^{k} \gamma_{ij}\delta_i B_i \quad (89)$$

$$C_{sj} = -\sum_{i=1}^{k} \gamma_{ij}\delta_i C_i \quad D_{sj} = -\sum_{i=1}^{k} \gamma_{ij}\delta_i D_i \quad (90)$$

$$Z(\mu, P, M) := \begin{bmatrix} A^T(\mu)P + PA(\mu) & PB(\mu) - C^T(\mu)M^T \\ B^T(\mu)P - MC(\mu) & -(MD(\mu) + D^T(\mu)M^T) \end{bmatrix} \quad (91)$$

Substituting equations 87-91 in 85, the optimal sensor blending problem can be stated as follows: Find matrices $P \in R^{n \times n}$, $(P=P^T>0)$ and $M \in R^{r \times l}$ which will maximize $\theta$ subject to:

$$Z(\mu, P, M) < \theta \begin{bmatrix} A_{sj}^T P + PA_{sj} & PB_{sj} - C_{sj}^T M^T \\ B_{sj}^T P - MC_{sj} & -(MD_{sj} + D_{sj}^T M^T) \end{bmatrix} \quad (92)$$

for $j=1, 2, \ldots 2^k$.

After sensor blending, the resulting pair (MC, A) must retain observability. The following constraints are added to ensure observability for $p=\mu$:

$$\begin{bmatrix} A^T(\mu)Q_0 + Q_0 A(\mu) & C^T(\mu)M^T \\ MC(\mu) & -I \end{bmatrix} < 0 \quad (93)$$

$$Q_0 > \varepsilon_0 \quad (94)$$

where $\epsilon_0$ is the specified lower bound on $Q_0$, a measure of observability.

Equations 92-94 define a generalized eigenvalue problem which can be solved by using LMI methods. If $\underline{p_i}$ and $\overline{p_i}$ are not known apriori, but only their nominal values ($\mu_i$) are known, it would be necessary to guess the corresponding $\delta_i$ and the maximum $\theta$ obtained will depend on the choice of $\delta_i$'s.

Note that, if D=0, the off-diagonal blocks in the passivity LMI (equation 85) must be zero. If uncertain parameters are present only in the matrix, then robust passification is possible even when D=0. If, however, uncertain parameters are present in B and/or C, it will be necessary to have a nonzero D matrix in order to satisfy the sufficient conditions of equation 92. Thus if the system to be passified by sensor blending is strictly proper, an additional unknown variable D will have to be included in order to make the system (A, B, MC, D) robustly passive. The generalized eigenvalue problem is re-stated as follows for the strictly proper case.

For the strictly proper case, the solution is to find matrices $P \in R^{n \times n}$, $(P=P^T>0)$, $D \in R^{r \times r}$, and $M \in R^{r \times l}$ which will maximize $\theta$ subject to:

$$\begin{bmatrix} A^T(\mu)P + PA(\mu) & PB(\mu) - C^T(\mu)M^T \\ B^T(\mu)P - MC(\mu) & -(D + D^T) \end{bmatrix} < \theta \begin{bmatrix} A_{sj}^T P + PA_{sj} & PB_{sj} - C_{sj}^T M^T \\ B_{sj}^T P - MC_{sj} & 0 \end{bmatrix} \quad (95)$$

for $j=1, 2, \ldots 2^k$.

If the D matrix is added to a strictly proper system and K(s) denotes the feedback controller for the passified system (A, B, MC, D), the effective controller (from y=Cx to u) becomes $K_{eff}(s)=[I+K(s)D]^{-1}K(s)M$. If K is a constant positive definite matrix, $K_{eff} \to D^{-1}M$ as K is increased. Thus D has the effect of reducing and limiting the effective control gain. Therefore, if D is a design variable, it is desirable to make it as small as possible, which can be accomplished by placing an upper bound on it (i.e., $D+D^T < d_{max}I$).

Note that even for the non-strictly-proper case, an additional variable $\tilde{D}$ can be used for making (A, B, MC, MD+$\tilde{D}$) passive. This usually increases the region of robust passivity but reduces the effective controller gain.

For optimal control allocation (r>1), it is required to find a control allocation matrix $N \in R^{r \times l}$ such that the system $S_N=[A, BN, C, DN]$ is passive. It is also required to maximize the size of the parameter box $\beta$ within which the system remains passive. Define $$\hat{Z}(\mu, \Sigma, N) := \begin{bmatrix} A(\mu)\Sigma + \Sigma A^T(\mu) & B(\mu)N - \Sigma C^T(\mu) \\ B^T(\mu) - C(\mu)\Sigma & -(D(\mu)N + N^T D^T(\mu)) \end{bmatrix} \quad (96)$$

The problem can be stated as follows: Find matrices $\Sigma \in R^{n \times n}$, $(\Sigma=\Sigma^T>0)$ and $N \in R^{r \times l}$ which will maximize $\theta$ subject to:

$$\hat{Z}(\mu, \Sigma, N) < \theta \begin{bmatrix} A_{sj}\Sigma + \Sigma A_{sj}^T & B_{sj}N - \Sigma C_{sj}^T \\ N^T B_{sj}^T - C_{sj}\Sigma & -(D_{sj}N + N^T D_{sj}^T) \end{bmatrix} \quad (97)$$

for $j=1, 2, \ldots 2^k$

A lower bound constraint on a measure of controllability $Q_c$ is also needed:

$$\begin{bmatrix} A(\mu)Q_c + Q_c A^T(\mu) & B(\mu)N \\ N^T B^T(\mu) & -I \end{bmatrix} < 0 \quad (98)$$

$$Q_c > \varepsilon_c I \quad (99)$$

where $\epsilon_c$ is the specified lower bound on Qc.

When redundant actuators and sensors are present, it would be advantageous to perform both control allocation and sensor blending. If we let $m \leq \min(r, l)$. The problem is to find matrices $M \in R^{m \times l}$, $N \in R^{r \times m}$ such that the system (A, BN, MC, MDN) is robustly passive (i.e., find a positive definite matrix P and matrices M, N such that $\theta$ is maximized subject to $$\begin{bmatrix} A^T(\mu)P + PA(\mu) & PB(\mu)N - C^T(\mu)M^T \\ N^T B^T(\mu)P - MC(\mu) & -(MD(\mu)N + N^T D^T(\mu)M^T) \end{bmatrix} < \quad (100)$$

$$\theta \begin{bmatrix} A_{sj}^T P + PA_{sj} & PB_{sj}N - C_{sj}^T M^T \\ N^T B_{sj}^T P - MC_{sj} & -(MD_{sj}N + N^T D_{sj}^T M^T) \end{bmatrix}$$

for j=1, 2, ... $2^k$, or, using the dual LMI for passivity, the problem is to find a positive definite matrix and $\Sigma$ and matrices M, N such that $\theta$ is maximized subject to $$\begin{bmatrix} A(\mu)\Sigma + \Sigma A^T(\mu) & B(\mu)N - \Sigma C^T(\mu) \\ N^T B^T(\mu) - MC(\mu)\Sigma & -(MD(\mu)N + N^T D^T(\mu)M^T) \end{bmatrix} < \quad (101)$$

$$\theta \begin{bmatrix} \Sigma A_{sj}^T + A_{sj}^T \Sigma & B_{sj}N - \Sigma C_{sj}^T M^T \\ N^T B_{sj}^T - MC_{sj}\Sigma & -(MD_{sj}N + N^T D_{sj}^T M^T) \end{bmatrix}$$

for j=1, 2, ... $2^k$. Unfortunately, quadratic terms involving products of (M, N), (P, N) and ($\Sigma$, M) are present in equations 100 and 101, and are therefore no longer LMIs. However, a possible procedure for solving this problem is to iterate between sensor blending and control allocation. After selecting an m≦min(r,l), a full rank M matrix is arbitrarily selected and the optimal control allocation problem is solved, yielding an N matrix. Next, the optimal sensor blending problem is solved for this fixed N, yielding a new M. The procedure is stopped when the $\theta$s obtained are sufficiently close and large.

Figure 5:
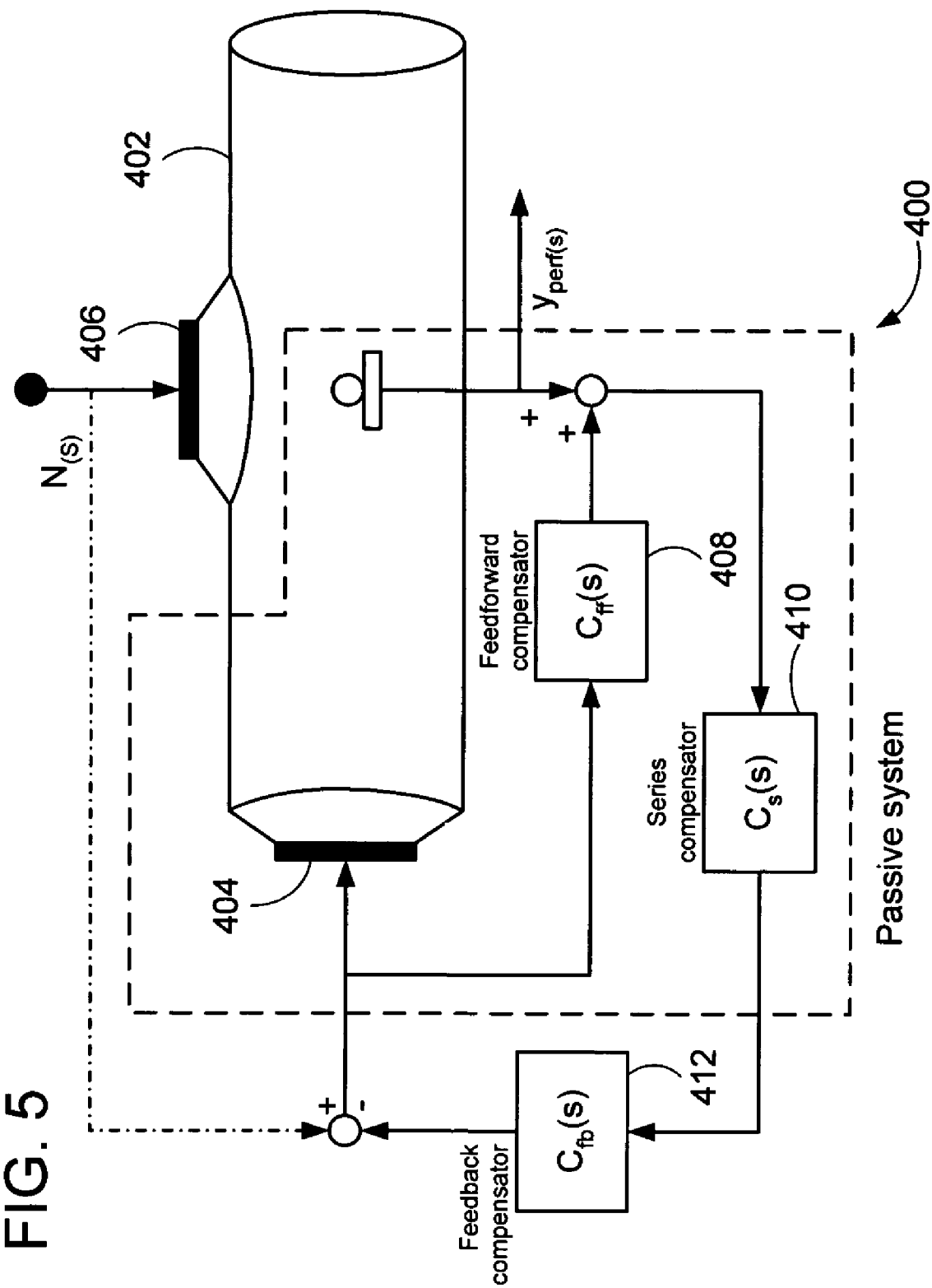
FIG. 5 illustrates a passivity based controller structure in accordance with the present invention for a one-dimensional enclosure system.

The techniques of passification have been described. FIG. 5 shows a passivity based controller structure 400 for a one dimensional enclosure system 402 using the techniques described above. Speaker 404 is the control speaker and speaker 406 is the disturbance-generating speaker. $C_{ff}(s)$ compensator 408 denotes the transfer function of the feedforward part of the controller 400. $C_s(s)$ compensator 410 denotes the transfer function of the series part of the controller 400. $C_{fb}(s)$ compensator 412 denotes the transfer function of the feedback part of the controller 400. N(s) and $y_{perf}(s)$ denote the Laplace transforms of the disturbance noise and the sensed noise respectively.

Figure 6:
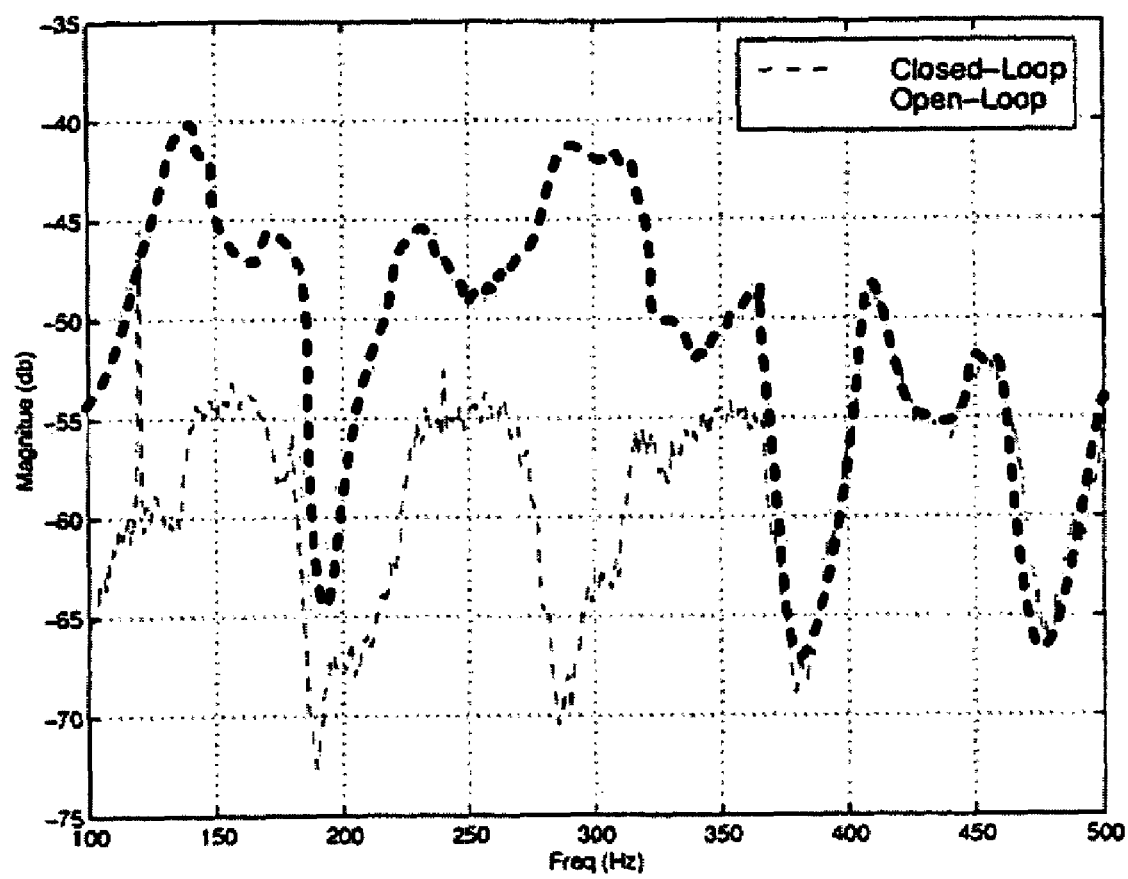
FIG. 6 is a graph illustrating experimentally obtained frequency-domain noise suppression response for the enclosure of FIG. 5 for a broadband disturbance.
Figure 7:
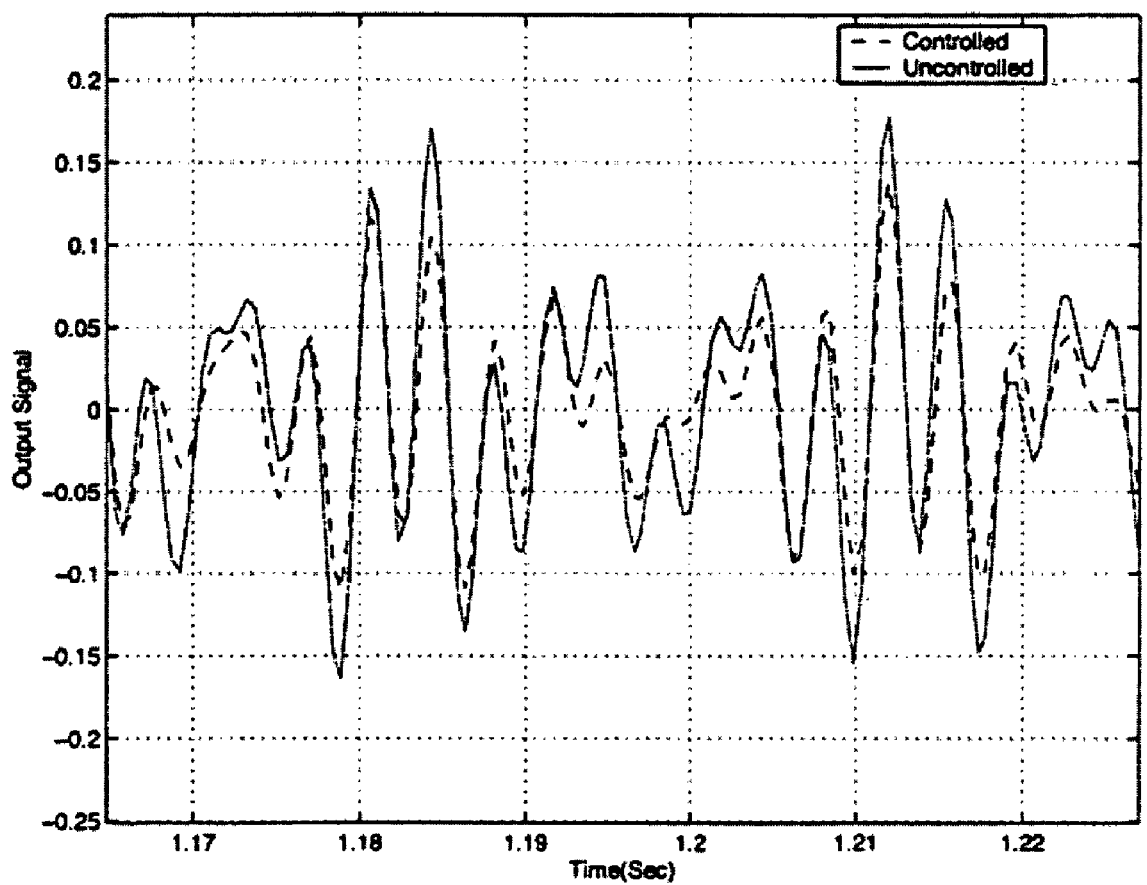
FIG. 7 is a graph illustrating noise suppression using the teachings of the present invention in a three-dimensional reverberant structure for a three-tone disturbance noise at frequencies of 100 Hz, 2256 Hz, and 290 Hz.
Figure 8:
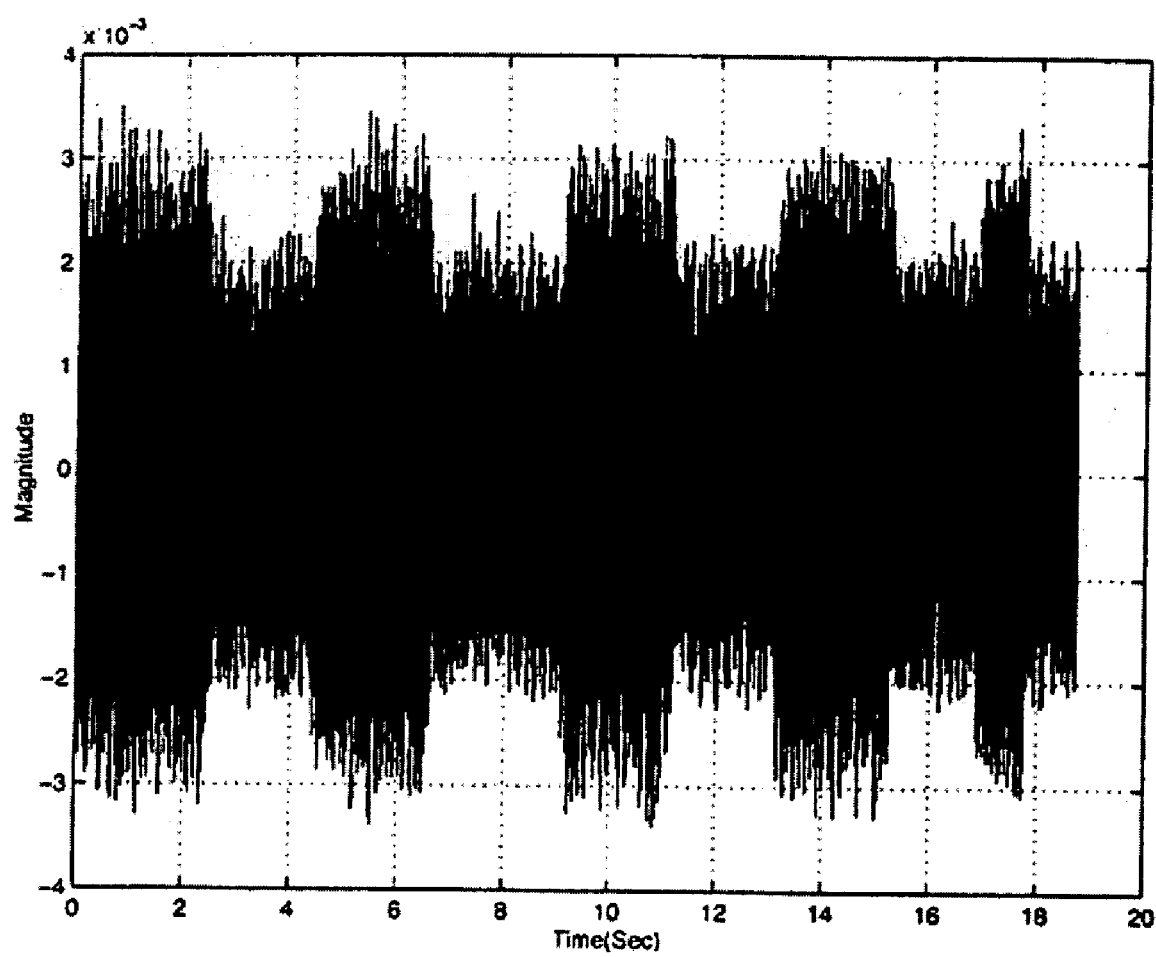
FIG. 8 is a graph illustrating experimentally obtained noise suppression response for the system of FIG. 7.

FIG. 6 shows the experimentally obtained frequency-domain noise suppression response for the enclosure 402 for a broadband disturbance noise. FIG. 7 shows noise suppression in a three-dimensional reverberant structure for a three-tone disturbance noise at frequencies of 100 Hz, 225 Hz, and 290 Hz that was obtained via simulation. FIG. 8 shows the experimentally obtained noise suppression response for the structure of FIG. 7. The suppressed noise levels correspond to the "controller on" condition.

Figure 9:
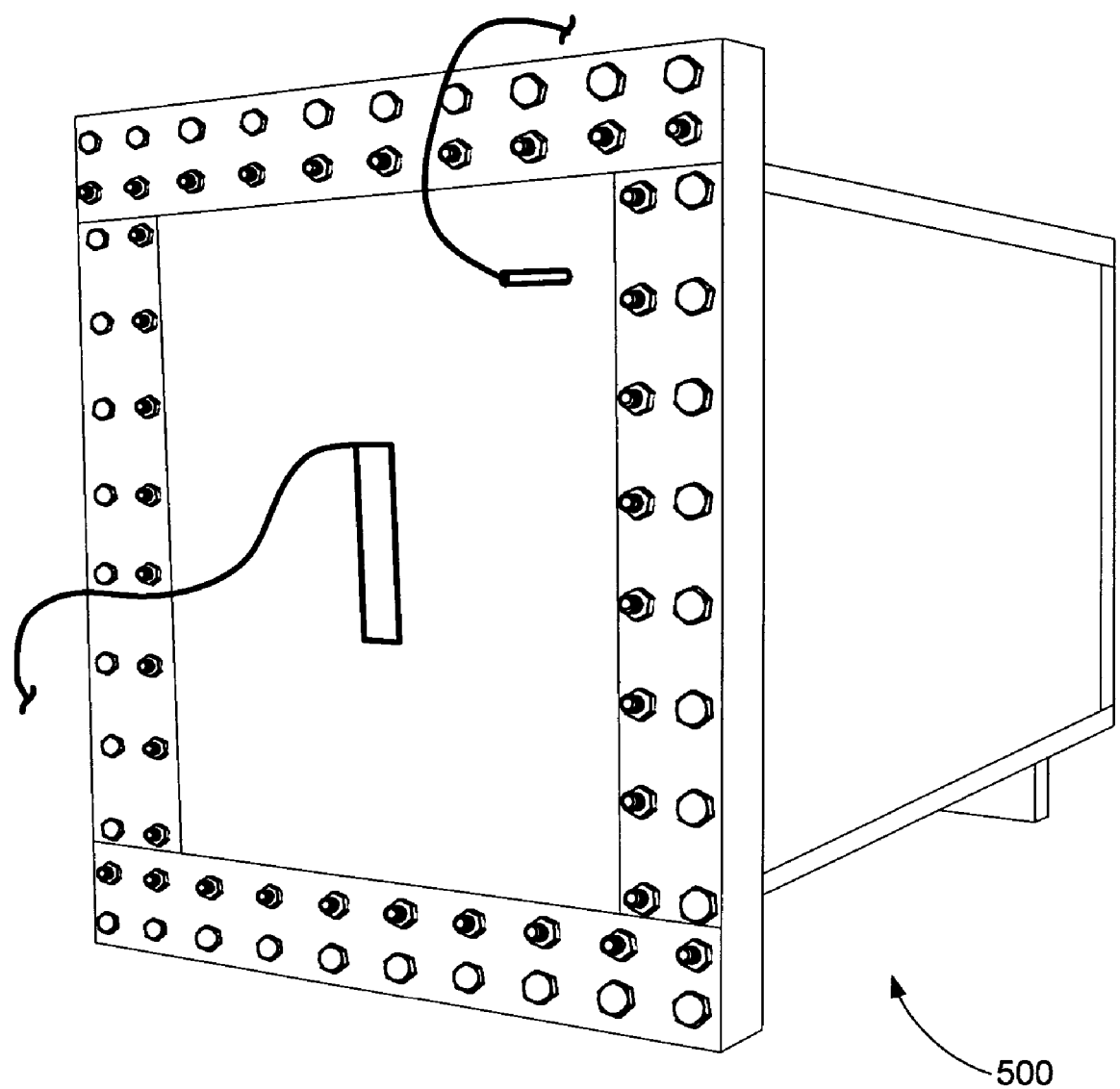
FIG. 9 is an isometric view of a three dimensional enclosure having a vibrating surface.

Now that the modeling, passification, and controller design has been described, an example shall be provided. Analytically derived models (i.e., equations 37 and 42), for the acoustic-structure interaction dynamics in 3-D enclosures having configuration shown in FIG. 1, are used to obtain the finite-dimensional models for the laboratory apparatus shown in FIG. 9. The laboratory apparatus 500 is a rectangular wooden box with one of its surfaces being the aluminum plate. This surface can be set into vibrations to generate an acoustic disturbance inside the box using a piezoactuator attached at the center of the aluminum plate. System parameters for this 3-D acoustic enclosure are given in Table 1.

TABLE 1

| Parameter | Value | Parameter | Value |
|---|---|---|---|
| $l_x$ | 0.3048 m | $l_y$ | 0.3810 m |
| $l_z$ | 0.7874 m | a | 0.0063 m |
| b | 0.2985 m | c | 0.0063 m |
| d | 0.3747 m | h | 0.000813 m |
| E | $71 * 10^9$ N/m$^2$ | $\mu$ | 0.33 |
| $\rho$ | 2810 kg/m$^3$ | $c_0$ | 343 m/s |
| $\rho_0$ | 1.13 kg/m$^3$ | $x_0$ | 0.1270 m |
| $y_0$ | 0.1524 m | $z_0$ | 0.3112 m |
| $x_1$ | 0.1524 m | $y_1$ | 0.1905 m |

Using the parameter values of Table 1 and assumed modes approximation, a transfer function model of the system is obtained using equation 42. For finite dimensional approximation, the first five modes in each x, y, and z direction are considered, which yield a total of 125 modes.

In order to validate the analytical model, an experimental frequency response was obtained using swept sine excitation of the piezoactuator as well as the speaker and measuring the acoustic pressure at the sensing microphone. The sensing microphone is located at location (171, 177, 285) mm. Using this experimental frequency response data, the state-space model of the system was derived using system identification techniques. The system identification toolbox SOCIT (developed at NASA LARC) was used for this purpose. The SOCIT toolbox uses ERA (Eigensystem Realization Algorithm) method, which is based on Markov parameters and singular value decomposition techniques. The ERA uses modal amplitude coherence for ranking of the most effective modes of the system. For the system under consideration, this identification algorithm gave a very satisfactory match. The identified model is a 40th order model. It is to be noted that identification becomes increasingly difficult as we go from SISO to MIMO systems. For the MIMO case, it is very hard to obtain a good match and it invariably yields very high order modes.

The natural frequencies obtained from the identified system model were compared with the natural frequencies determined from analytical model to assess the accuracy of the analytical model. The comparison is given in Table 2. The symbol * in the second column denotes the frequencies that are missing from the analytical model but appear in identified model. Similarly, the symbol # in the third column denotes the frequencies that are missing in the identified model but appear in analytical model. The missing dynamics in the analytical model is attributed to the fact that the analytical model does not account for actuator, sensor, and other hardware dynamics and the boundary conditions used to derive analytical model are only approximate. In particular, the modes 2, 7, 11, 14, and 19 are missing in the analytical model. The modes 3, 9, 10, 18, 21, 22, and 24 are missing in the identified model. The modes 9 and 10 are very close to 8 and with appropriate damping may collapse onto one. This may be the case for the missing modes 9 and 10 in the identified model. For the same reason, modes 18 and 24 are missing in the identified model. The modes 3, 21 and 22 seem to be highly damped in the experimental data which is why the identification algorithm cannot detect.

The frequencies listed in Table 2 do not account for boundary impedance, i.e., it assumes the perfectly hard boundary with zero transmissibility. For controller design, the identified system model is used as the design model since it represents the system more accurately than the analytical model. Although the natural frequencies from analytical model match reasonably well with natural frequencies from experimental data, the damping on each mode needs to be adjusted manually since there is no systematic method to derive it

TABLE 2

| | Frequency (Hz) | |
|---|---|---|
| Mode no. | Analytical | Experimental |
| 1 | 37.5 | 39.2 |
| 2 | * | 64.0 |
| 3 | 80.8 | # |
| 4 | 106.4 | 98.4 |
| 5 | 149.8 | 125.5 |
| 6 | 153.2 | 157.7 |
| 7 | * | 182.4 |
| 8 | 217.8 | 222.4 |
| 9 | 221.4 | # |
| 10 | 222.1 | # |
| 11 | * | 239.0 |
| 12 | 254.4 | 251.3 |
| 13 | 264.8 | 262.1 |
| 14 | * | 280.5 |
| 15 | 323.4 | 327.1 |
| 16 | 337.1 | 351.0 |
| 17 | 382.3 | 381.0 |
| 18 | 384.6 | # |
| 19 | * | 416.7 |
| 20 | 425.7 | 423.5 |
| 21 | 435.6 | # |
| 22 | 438.4 | # |
| 23 | 450.1 | 454.5 |
| 24 | 453.6 | # |
| 25 | 498.0 | 479.0 |

AAs can be seen from the above description, the approach taken here is to first attempt designing a feedforward compensation to passify the system. If this is not acceptable (for example, in the case of non-minimum-phase systems, large gain matrices may be required), a constant-gain feedforward compensation is designed to only to render the system minimum-phase. The resulting system is then rendered PR by a series (pre- or post-) compensation, or if applicable, by sensor blending and/or control allocation. The next step is to design a PR controller so that the resulting closed-loop response shows the desired noise reduction.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for extracting acoustic energy and structural energy in an acoustic enclosure using a plurality of actuators comprising the steps of:

obtaining a continuous-time multi-input multi-output state-space mathematical model of the acoustic enclosure;

designing compensation to render the mathematical model passive in accordance with mathematical system theory if the mathematical model is not passive, thereby forming a compensated system that is passive;

checking passivity of the compensated system;

designing a passivity-based controller that extracts the acoustic energy and the structural energy such that a resulting closed-loop response provides a desired noise reduction; and extracting acoustic and structural energy from the acoustic enclosure using the actuators by controlling the actuators with the passivity-based controller.

2. The method of claim 1 wherein the step of obtaining a continuous-time multi-input multi-output state-space mathematical model of the acoustic enclosure comprises the step of obtaining a mathematical model having the form according to the equation $$E\dot{x}(t)=Ax(t)+Bu(t)+Df(t)$$

where A, B, D, and E are matrices given by $$E = \begin{bmatrix} E_{11} & 0 \\ E_{21} & E_{22} \end{bmatrix} \quad A = \begin{bmatrix} A_{11} & 0 \\ 0 & A_{22} \end{bmatrix}$$

$$B = \frac{1}{h\rho_0 S_1}\begin{bmatrix} B_{11} \\ 0 \end{bmatrix} \quad D = \frac{1}{h\rho_0}\begin{bmatrix} D_{11} \\ 0 \end{bmatrix}$$

where $E_{11}=I$ and $A_{11}=\text{diag}(A_{11}^{nm})$ are square matrices of order $p_1p_2$, $E_{22}=I$ and $A_{22}=\text{diag}(A_{22}^{k_1k_2k_3})$ are square matrices of order $(l_1+1)(l_2+1)(l_3+1)$, $B_{11}$ is a $p_1p_2 \times r$ matrix, $D_{11}$ is a $p_1p_2 \times 1$ matrix where matrices $E_{21}, A_{11}, A_{22}, B_{11},$ and $D_{11}$ are given by $$E_{21} = -\frac{c_0^2\rho_0}{V}\begin{bmatrix} 0 & 0 & \cdots 0 & 0 \\ 0 & \alpha_{00111} & \cdots 0 & \alpha_{001p_1p_2} \\ & \cdots & \cdots & \cdots \\ 0 & 0 & \cdots 0 & 0 \\ 0 & \alpha_{l_1l_2l_311} & \cdots 0 & \alpha_{l_1l_2l_3p_1p_2} \end{bmatrix}$$

-continued $$A_{11}^{nm} = \begin{bmatrix} 0 & 1 \\ -\omega_{nm}^2 & -2\zeta_{nm}\omega_{nm} \end{bmatrix}$$

$$A_{22}^{k_1k_2k_3} = \begin{bmatrix} 0 & 1 \\ -\omega_{k_1k_2k_3}^2 & -2\zeta_{k_1k_2k_3}\omega_{k_1k_2k_3} \end{bmatrix}$$

$$B_{11} = \begin{bmatrix} 0 & \cdots & 0 \\ \phi_{11}(x_{11}, y_{11}) & \cdots & \phi_{11}(x_{1r}, y_{1r}) \\ \cdots & \cdots & \cdots \\ 0 & \cdots & 0 \\ \phi_{p_1p_2}(x_{11}, y_{11}) & \cdots & \phi_{p_1p_2}(x_{1r}, y_{1r}) \end{bmatrix}$$

$$D_{11} = \begin{bmatrix} 0 \\ \gamma_{11} \\ \cdots \\ 0 \\ \gamma_{p_1p_2} \end{bmatrix}$$

where h is a thickness of the enclosure, $\rho_0$ is fluid density at equilibrium, $S_1$ is a boundary surface of the structure, $c_0$ is the sound speed, V is the volume of the enclosure, $\alpha$'s are coupling coefficients describing the modal interaction between structural and acoustic modes, $\omega_{ij}$ denotes natural frequency related to ij-th mode for the structure, $\omega_{ijk}$ denotes the acoustical modal frequency for the ijk-th acoustic mode of the enclosure, $\zeta_{ij}$ is the damping of the ij-th structural mode shape, $\zeta_{ijk}$ is the damping of the ijk-th acoustical mode shape, $\phi_{ij}$ is the ij-th mode shape of the enclosure structure, and $\gamma_{ij}$ matrix $D_{11}$ indicate non-zero coefficients for the direct transmission terms which are functions of modal parameters.

3. The method of claim 1 wherein the step of designing a passivity-based controller includes designing a controller having a transfer function G(s) wherein $$G(s) = Js^2 \sum_{k_1=0}^{l_1} \sum_{k_2=0}^{l_2} \sum_{k_3=0}^{l_3} \frac{\psi_{k_1k_2k_3}(x,y,z)}{s^2 + 2\zeta_{k_1k_2k_3}\omega_{k_1k_2k_3}s + \omega_{k_1k_2k_3}^2} \left[ \sum_{n=1}^{P_1} \sum_{m=1}^{P_2} \frac{\alpha_{k_1k_2k_3nm}\phi_{nm}(x_{11}, y_{11})}{s^2 + 2\zeta_{nm}\omega_{nm}s + \omega_{nm}^2} \right]$$

where $$J = \frac{c_0^2 \rho_0}{V h \rho_p S_1},$$

h is a thickness of the enclosure, $\rho_0$ is fluid density at equilibrium, $S_1$ is a boundary surface of the structure, $c_0$ is the sound speed, $\rho_p$ is the density of the plate, $\Psi_{k_1k_2k_3}(x, y, z)$ are normal modes of a non-homogeneous wave equation, $\omega_{k_1k_2k_3} = c_0\sqrt{\xi_{k_1}^2 + \xi_{k_2}^2 + \xi_{k_3}^2}$ with $\xi_{k_1}$, $\xi_{k_2}$, and $\xi_{k_3}$ being modal coordinates, $\zeta_{ijk}$ is the damping of the ijk-th acoustical mode shape, $\alpha$'s are coupling coefficients describing the modal interaction between structural and acoustic modes, and $\zeta_{ij}$ is the damping of the ij-th structural mode shape.

4. The method of claim 1 wherein the acoustic enclosure has a soft boundary and the step of designing a passivity-based controller includes designing a controller having a transfer function $G_{sb}(s)$ wherein $$G_{sb}(s) = \sum_{i=1}^{l} \frac{\rho_0 s^2 c_0^2}{h\rho_p S_1} \cdot \frac{\Psi_i(r_0)}{s^2 + \rho_0 c_0^2 s D_{ii}(s) + c_0^2 \beta_{ii}} \cdot \left[ \sum_{n=1}^{p_1} \sum_{m=1}^{p_2} \frac{\eta_{inm} Q_{nm}(x_{11}, y_{11})}{s^2 + 2\zeta_{nm}\omega_{nm}s + \omega_{nm}^2} \right]$$

where $\Psi_i$ denotes the eigenmode function for the acoustic pressure expression obtained using the assumed modes method, $\eta_{inm}$ is the volume integral term consisting of integrand which is product of structural-acoustic eigenfunctions, $\zeta_{ij}$ is the damping of the ij-th structural mode shape, $\rho_0$ is fluid density at equilibrium, $c_0$ is the sound speed, $S_1$ is a boundary surface of the structure, h is a thickness of the enclosure, $\rho_p$ is the density of the plate, $\Phi_{ij}$ is the ij-th mode shape of the enclosure structure, and $$D_{ij}(s) = \int_S \frac{\Psi_j(s)\Psi_i(s)}{Z(r,s)} dS,$$

$$\beta_{ij}(s) = \int_V \nabla \Psi_j(r) \nabla \Psi_i(r) dV \text{ where Z is the impedance.}$$

where Z is the impedance.

5. The method of claim 1 wherein the step of designing compensation includes the step of designing a series passifier $C_s(s)$ according to $$C_s(s) \sim \begin{cases} \dot{x}_c = A_c x_c + B_c u \\ u' = C_c x_c + D_c u \end{cases}$$

wherein Ac, Bc, Cc, and Dc are determined according to the steps comprising:

solving the equation $\begin{bmatrix} A^{**} & (*) & (*) \\ \hat{A} + A^T & YA + A^TY & (*) \\ \hat{D}^T B^T - CX - D\hat{C} & \hat{B}^T - C & D^{**} \end{bmatrix} < 0$ to obtain $X$, $Y$, $\hat{A}$, $\hat{B}$, $\hat{C}$, and $\hat{D}$;

constructing matrices M, N, and P such that $$P\Pi_1 = \Pi_2 \text{ and } \Pi_1^T \Pi_2 \begin{bmatrix} X & I \\ I & Y \end{bmatrix} \text{ where } XY + MN^T = I,$$

$$\Pi_1 = \begin{bmatrix} X & I \\ M^T & 0 \end{bmatrix},$$

$$\Pi_2 = \begin{bmatrix} I & Y \\ 0 & N^T \end{bmatrix}, P = \begin{bmatrix} Y & N \\ N^{T*} \end{bmatrix};$$

and
   solving the equations $\hat{A}=YAX+YBC_cM^T+NA_cM^T$, $\hat{B}=YBD_c+NB_c$, $\hat{C}=C_cM^T$, and $\hat{D}=D_c$ in reverse order to obtain Ac, Bc, Cc, and Dc.

6. The method of claim 1 wherein the step of designing compensation comprises the step of designing a feedforward compensator $C_{ff}(s)$ according to $$C_{ff}(s) \sim \begin{cases} \dot{x}_c = A_x x_x + B_c u \\ y_2 = C_c x_c + D_c u \end{cases}$$

wherein Ac, Bc, Cc, and Dc are determined according to the steps comprising:

solving the equation $\begin{bmatrix} AX+XA^T & (*) & (*) \\ \hat{A}+A^T & YA+A^TY & (*) \\ B^T-CX-\hat{C} & B^TY+\hat{B}^T-C & D^\perp \end{bmatrix} < 0$ where $D^\perp=-(D+D^T+\hat{D}+\hat{D}^T)$ to obtain $X, Y, \hat{A}, \hat{B}, \hat{C}$, and $\hat{D}$; constructing matrices M, N, and P such that $P\Pi_1 = \Pi_2$ and $\Pi_2^T \tilde{A} \Pi_1 = \begin{bmatrix} AX & A \\ YAX+NA_cM^T & YA \end{bmatrix}$ where $XY+MN^T = I$, $\Pi_1 = \begin{bmatrix} X & I \\ M^T & 0 \end{bmatrix}$, $\Pi_2 = \begin{bmatrix} I & Y \\ 0 & N^T \end{bmatrix}$, $P = \begin{bmatrix} Y & N \\ N^{T*} & \end{bmatrix}$; and solving the equations $\hat{A}=YAX+NA_cM^T$, $\hat{B}=NB_c$, $\hat{C}=C_cM^T$, and $\hat{D}=D_c$ in reverse order to obtain Ac, Bc, Cc, and Dc.

7. The method of claim 1 wherein the step of designing compensation to render the mathematical model passive comprises the steps of:
   determining if a feedforward compensation will passify the system;
   if a feedforward compensation will not passify the system:
      designing a constant gain feedforward compensation to render the compensated system minimum-phase; and
      rendering the compensated system positive-real by at least one of series compensation, sensor-blending and control allocation.

8. The method of claim 7 wherein the step of designing a passivity-based controller comprises the step of designing one of a dissipative linear-quadratic-Gaussian (LQG) type positive-real controller and a dissipative constant gain positive-real controller.

9. The method of claim 7 wherein the step of rendering the compensated system positive-real by at least one of series compensation, sensor-blending and control allocation comprises the step of rendering the compensated system positive-real by at least one of series compensation, feedback compensation, hybrid compensation, and sensor-blending and control allocation.

10. The method of claim 1 further comprising the step of redesigning the compensation if the passivity is not preserved.

11. The method of claim 1 further comprising the step of performing numerical simulations of the controller in the presence of a simulated broadband disturbance input.

12. The method of claim 11 further comprising the step of redesigning the controller if the closed-loop response is not satisfactory.

13. A method for extracting acoustic energy and structural energy in an acoustic enclosure using a plurality of actuators comprising the steps of:
   obtaining a continuous-time multi-input multi-output state-space mathematical model of the acoustic enclosure;
   designing compensation to render the mathematical model passive in accordance with mathematical system theory if the mathematical model is not passive, thereby forming a compensated system that is passive;
   checking passivity of the compensated system;
   designing a passivity-based controller that extracts at least one of acoustic energy or structural energy such that a resulting closed-loop response provides a desired noise reduction;
   wherein the step of designing compensation comprises the step of performing sensor blending if there are redundant sensors; and
   extracting acoustic and structural energy from the acoustic enclosure using the actuators by controlling the actuators with the passivity-based controller.

14. A method for extracting acoustic energy and structural energy in an acoustic enclosure using a plurality of actuators comprising the steps of:
   obtaining a continuous-time multi-input multi-output state-space mathematical model of the acoustic enclosure;
   designing compensation to render the mathematical model passive in accordance with mathematical system theory if the mathematical model is not passive, thereby forming a compensated system that is passive;
   checking passivity of the compensated system;
   designing a passivity-based controller that extracts at least one of acoustic energy or structural energy such that a resulting closed-loop response provides a desired noise reduction;
   wherein the step of designing compensation comprises the step of performing control allocation if there are redundant actuators; and
   extracting acoustic and structural energy from the acoustic enclosure using the actuators by controlling the actuators with the passivity-based controller.

15. A method for extracting acoustic energy and structural energy in an acoustic enclosure using a plurality of actuators comprising the steps of:
   obtaining a continuous-time multi-input multi-output state-space mathematical model of the acoustic enclosure;
   designing compensation to render the mathematical model passive in accordance with mathematical system theory if the mathematical model is not passive, thereby forming a compensated system that is passive;
   checking passivity of the compensated system;
   designing a passivity-based controller that extracts at least one of acoustic energy or structural energy such that a resulting closed-loop response provides a desired noise reduction;
   wherein the step of designing compensation comprises the steps of:
   designing a constant gain feedforward compensation to render the compensated system minimum phase;
   rendering the compensated system positive-real by one of sensor-blending and control allocation; and
   extracting acoustic and structural energy from the acoustic enclosure using the actuators by controlling the actuators with the passivity-based controller.

* * * * *

UNITED STATES PATENT AND TRADEMARK OFFICE
CERTIFICATE OF CORRECTION

PATENT NO. : 7,623,993 B2  Page 1 of 1
APPLICATION NO. : 10/731742
DATED : November 24, 2009
INVENTOR(S) : Kelkar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,993 B2 | |
| APPLICATION NO. | : 10/731742 | |
| DATED | : November 24, 2009 | |
| INVENTOR(S) | : Atul Kelkar et al. | |

It is certified that error appears in the above-identified patent and that said Letters Patent is hereby corrected as shown below:

<u>Title Page item 73</u>

Under Assignee, add --Administrator of the National Aeronautics and Space Administration, Washington, D.C.--

Signed and Sealed this
First Day of February, 2011

David J. Kappos
*Director of the United States Patent and Trademark Office*